US008470151B2

(12) United States Patent
Liu et al.

(10) Patent No.: US 8,470,151 B2
(45) Date of Patent: Jun. 25, 2013

(54) MICROFLUIDIC PUMPING BASED ON DIELECTROPHORESIS

(71) Applicant: Purdue Research Foundation, West Lafayette, IN (US)

(72) Inventors: Dong Liu, Houston, TX (US); Suresh V. Garimella, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 13/668,482

(22) Filed: Nov. 5, 2012

(65) Prior Publication Data

US 2013/0075259 A1 Mar. 28, 2013

Related U.S. Application Data

(62) Division of application No. 12/194,913, filed on Aug. 20, 2008, now Pat. No. 8,308,926.

(60) Provisional application No. 60/965,444, filed on Aug. 20, 2007.

(51) Int. Cl.
*G01N 27/447* (2006.01)

(52) U.S. Cl.
USPC .............................................. 204/547; 417/48

(58) Field of Classification Search
USPC .................... 204/643, 547; 417/48–50, 44.11
See application file for complete search history.

(56) References Cited

U.S. PATENT DOCUMENTS

| | | | |
|---|---|---|---|
| 5,569,367 | A | 10/1996 | Betts |
| 6,318,970 | B1 | 11/2001 | Backhouse |
| 6,379,929 | B1 | 4/2002 | Burns et al. |
| 6,403,367 | B1 | 6/2002 | Cheng et al. |
| 6,415,821 | B2 | 7/2002 | Kamholz et al. |
| 6,440,725 | B1 | 8/2002 | Pourahmadi et al. |
| 6,576,459 | B2 | 6/2003 | Miles et al. |
| 6,653,136 | B1 | 11/2003 | Dodgson |
| 6,767,706 | B2 | 7/2004 | Quake et al. |
| 6,802,489 | B2 | 10/2004 | Marr et al. |
| 6,824,664 | B1 | 11/2004 | Austin et al. |
| 6,875,619 | B2 | 4/2005 | Blackburn |

(Continued)

FOREIGN PATENT DOCUMENTS

| | | | |
|---|---|---|---|
| WO | 0212896 | A1 | 2/2002 |
| WO | 03034041 | A1 | 4/2003 |

(Continued)

OTHER PUBLICATIONS

Singhal et al., "A Novel Valveless Micropump with Electrohydrodynamic Enhancement for High Heat Flux Cooling," IEEE Transactions on Advanced Packaging, vol. 28, No. 2, May 2005.

(Continued)

*Primary Examiner* — J. Christopher Ball
(74) *Attorney, Agent, or Firm* — John V. Daniluck; Bingham Greenebaum Doll LLP

(57) ABSTRACT

This paper presents a microfluidic pumping approach using traveling-wave dielectrophoresis (tw-DEP) of microparticles. Flow is generated directly in the microfluidic devices by inducing electromechanical effects in the fluid using microelectrodes. The fluidic driving mechanisms due to the particle-fluid and particle-particle interactions under twDEP are analyzed, and the induced flow field is obtained from numerical simulations. Experimental measurements of the flow velocity in a prototype DEP micropumping device show satisfactory agreement with the numerical predications.

4 Claims, 19 Drawing Sheets

U.S. PATENT DOCUMENTS

| | | | |
|---|---|---|---|
| 6,942,771 | B1 | 9/2005 | Kayyem |
| 6,949,176 | B2 | 9/2005 | Vacca et al. |
| 6,989,086 | B2 | 1/2006 | Cheng et al. |
| 7,016,560 | B2 | 3/2006 | Ticknor et al. |
| 7,070,681 | B2 | 7/2006 | Santiago et al. |
| 7,079,240 | B2 | 7/2006 | Scherer et al. |
| 7,081,192 | B1 | 7/2006 | Wang et al. |
| 7,166,443 | B2 | 1/2007 | Walker et al. |
| 7,277,284 | B2 | 10/2007 | Lee |
| 7,802,970 | B2 | 9/2010 | Singhal et al. |
| 2002/0055167 | A1 | 5/2002 | Pourahmadi et al. |
| 2002/0137059 | A1 | 9/2002 | Wu et al. |
| 2002/0182627 | A1 | 12/2002 | Wang et al. |
| 2003/0007898 | A1 | 1/2003 | Bohm et al. |
| 2004/0011650 | A1 | 1/2004 | Zenhausern et al. |
| 2004/0018611 | A1 | 1/2004 | Ward et al. |
| 2004/0067167 | A1 | 4/2004 | Zhang et al. |
| 2004/0112529 | A1 | 6/2004 | Karlsson et al. |
| 2004/0181343 | A1 | 9/2004 | Wigstrom et al. |
| 2004/0224380 | A1 | 11/2004 | Chou et al. |
| 2004/0248167 | A1 | 12/2004 | Quake et al. |
| 2005/0042615 | A1 | 2/2005 | Smith et al. |
| 2005/0092662 | A1 | 5/2005 | Gilbert et al. |
| 2005/0175478 | A1 | 8/2005 | Marr et al. |
| 2005/0211559 | A1 | 9/2005 | Kayyem |
| 2006/0056997 | A1 | 3/2006 | Shapiro |
| 2006/0131494 | A1 | 6/2006 | Grier et al. |
| 2006/0226012 | A1 | 10/2006 | Kanagasabapathi et al. |
| 2006/0252031 | A1 | 11/2006 | Abbott et al. |
| 2007/0052781 | A1 | 3/2007 | Fraden et al. |
| 2007/0105239 | A1 | 5/2007 | Lee et al. |
| 2007/0141561 | A1 | 6/2007 | Kim et al. |
| 2008/0047701 | A1 | 2/2008 | Bahadar |
| 2008/0108122 | A1 | 5/2008 | Paul et al. |

FOREIGN PATENT DOCUMENTS

| | | | |
|---|---|---|---|
| WO | 2004034436 | A2 | 4/2004 |
| WO | 2006004558 | A1 | 1/2006 |
| WO | 2006117541 | A1 | 11/2006 |
| WO | 2007021814 | A1 | 1/2007 |
| WO | 2007046871 | A2 | 4/2007 |
| WO | 2007051170 | A1 | 5/2007 |
| WO | 2007107910 | A1 | 9/2007 |
| WO | 2007116406 | A1 | 10/2007 |

OTHER PUBLICATIONS

Chen et al., “A Planar Electroosmotic Micropump,” Journal of Microelectromechanical Systems, vol. 11, No. 6, Dec. 2002.

Morgan et al., “The dielectrophoretic and travelling wave forces generated by interdigitated electrode arrays: analytical solution using Fourier series,” J.Phys. D: Appl. Phys., vol. 34 (2001), pp. 1553-1561.

Gascoyne et al., “Dielectrophoretic separation of mammalian cells studied by computerized image analysis,” Meas. Sci. Technol., vol. 3 (1992) pp. 439-445.

MICROFLUIDIC PUMPING BASED ON DIELECTROPHORESIS

CROSS REFERENCE TO RELATED APPLICATIONS

This application is a divisional of U.S. patent application Ser. No. 12/194,913, filed Aug. 20, 2008, which claims the benefit of priority to U.S. Provisional Patent Application Ser. No. 60/965,444, filed Aug. 20, 2007, entitled MICROFLUIDIC PUMPING BASED ON DIELECTROPHORESIS, the disclosures of which are expressly incorporated herein by reference.

FIELD OF THE INVENTION

The present inventions relate to the field of fluid and particle transportation, and especially to the field of micropumping.

BACKGROUND OF THE INVENTION

Novel microfluidic devices are being developed for various applications, including drug delivery, rapid chemical synthesis, biological diagnostics and electronics cooling. The ability to actuate and control fluid in small amounts with high precision and flexibility is critical to the success of microfluidic operations. Conventional pressure-driven pumping methods are inadequate in accommodating these requirements mainly due to the large pressure head needed; moreover, the use of an external pump in a microfluidic system defeats the purpose of miniaturization. Alternative solutions have been sought and a variety of innovative micropumping concepts have been proposed in the literature. One particularly attractive scheme is to generate the required flow directly in the microfluidic devices by inducing strong electromechanical forces in the fluid through electrokinetic effects. Based on the origin of the electromechanical forces, electrokinetic micropumps can be classified as electrohydrodynamic (EHD), electroosmotic (EO), and AC electroosmotic (AC EO), among others. The common feature of these micropumps is to actuate the liquid via an induced body force directly exerted on the fluid element. Recently, more complex fluids, such as colloidal suspensions containing a second phase (vapor bubbles, solid/soft particles or immiscible liquid droplets) have received attention in microfluidics research and applications. Examples include separation/concentration of biological cells in micro-total-analysis systems (μTAS) and application of nanofluids in advanced cooling systems. Due to the presence of the second phase in the fluid, another important electrokinetic effect, dielectrophoresis (DEP), can be exploited to generate effective microfluidic pumping upon the application of an external electric field.

Dielectrophoresis is the motion of small particles in colloidal suspensions when exposed to non-uniform electric fields, arising from the interaction of the induced dipole on the particle with the applied field. Dielectrophoresis has been employed extensively as a powerful tool for manipulating particles in biological research, such as in separation, trapping, sorting and translation of cells, viruses, proteins and DNA. However, DEP research to date has focused on controlling the electromechanical response of the solid particles, while largely neglecting the hydrodynamic interactions between the particles and the surrounding fluid, i.e., the motion of the surrounding fluid induced by drag from the dielectrophoretic particle motion due to viscous effects. In spite of the advances in colloid science and electromechanics, a gap still persists in the application of advances in the science of particle dynamics and low Reynolds-number hydrodynamics to the DEP technique. This gap must be bridged to facilitate the implementation of DEP in a broader range of applications. In particular, the potential of traveling-wave DEP (twDEP) as an effective means for microfluidic flow actuation has not yet been explored.

SUMMARY OF THE INVENTION

One aspect of the present invention pertains to fluid movement induced by the viscous drag of dielectrophoretically forced particles.

Another aspect of other embodiments of the present invention pertains to an apparatus for applying a three phase electric field to a flow channel and inducing fluid flow within the channel by the application of the three phase field.

Yet other aspects of the present invention pertain to means for exchanging heat between an object and a heat sink, in which the cooling medium is induced to move by the application of a traveling-wave dielectrophoretic force.

Yet other aspects of the present invention pertain to a method for selecting a range of frequencies of an alternating electric field based on calculations of the complex conjugate permittivities of both a fluid medium and also the particles colloidally suspended within the media. The selected frequency range is useful for inducing motion in the particle and media by a traveling-wave dielectrophoretic (tw-DEP) force.

These and other aspects and features of various embodiments of the present invention will be apparent from the description, claims, and figures that follow.

NOMENCLATURE USED IN THE EQUATIONS

Figure 1:
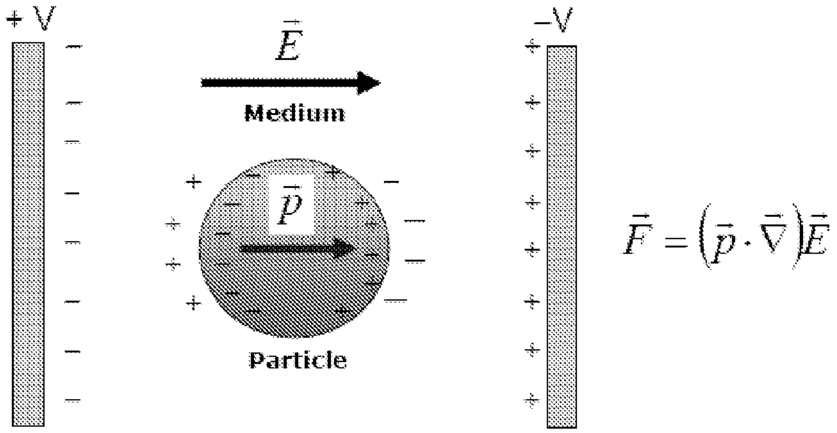
FIG. 1 is a schematic representation of a polarized dielectric particle within a uniform electric field.

A area
E electric field
F dielectrophoretic force
L inter-particle distance
V velocity
a particle radius
$d_1$ electrode width
$d_2$ spacing between neighboring electrodes
f frequency of the applied electrical signal
$f_{CM}$ Clausius-Mossotti factor
m mass
p dipole moment
t time
u velocity
Greek Symbols
$\in$ dielectric permittivity
Φ phase angle
μ viscosity
ρ mass density
σ electrical conductivity
ω angular frequency
Subscripts
f fluid
m medium
p particle

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, etc.) may be stated herein, such specific quantities are presented as examples only, and are not to be construed as limiting.

According to one embodiment of the present invention, there is a novel method for inducing movement of a fluid media by the application of a traveling-wave dielectrophoretic force (tw-DEP). The tw-DEP force is preferably applied to microparticles or nanoparticles within the fluid. The tw-DEP force causes movement of the particles in a direction within a channel, and viscous drag between the particles and the fluid media impart some of the momentum of the particle to the fluid media.

Yet another aspect of the present invention pertains to the selection of a suitable frequency for application of a tw-DEP force. The method includes calculation of the real and imaginary parts of the Clausius-Mossotti factor for a particular combination of particles within a fluid media. In some embodiments, the frequency is chosen such that the real component of the CM factor is preferably less than about 0, and the imaginary portion of the CM factor is less than about −0.02. For frequencies within this range, it has been found that there is sufficient levitation of the particles away from the electrodes inducing the field, and further sufficient rotational momentum imparted to the particles such that the electric fields establish a flow of particles and media within the channel.

In some embodiments of the present invention, it is observed that the tw-DEP electric field induces a region of recirculation in a region proximal to the strongest part of the field (such as near the electrodes), and a non-recirculating field of motion in the more distal portions of the electric field. As one example, a plurality of interdigitated electrodes are located along one side of a flow channel. When a three phase electric field is applied, areas of particle and media recirculation are set up near the electrodes. On the side of the channel opposite to the electrodes, there is a substantially unidirectional flow of particles and fluid.

In various embodiments of this invention there is described the method and apparatus for microscale flow actuation using dielectrophoretic motion of microparticles or nanoparticles via the viscous interaction between the particles and the surrounding fluid. Dielectrophoresis (DEP) is the motion of small particles in a surrounding medium, when exposed to a non-uniform electric field, due to the interaction between the induced dipole on the particles and the electric field. As the result of viscosity, the fluid surrounding the particles will be dragged to move in the same direction as the particles, giving rise to an effective pumping action.

Figure 17A:
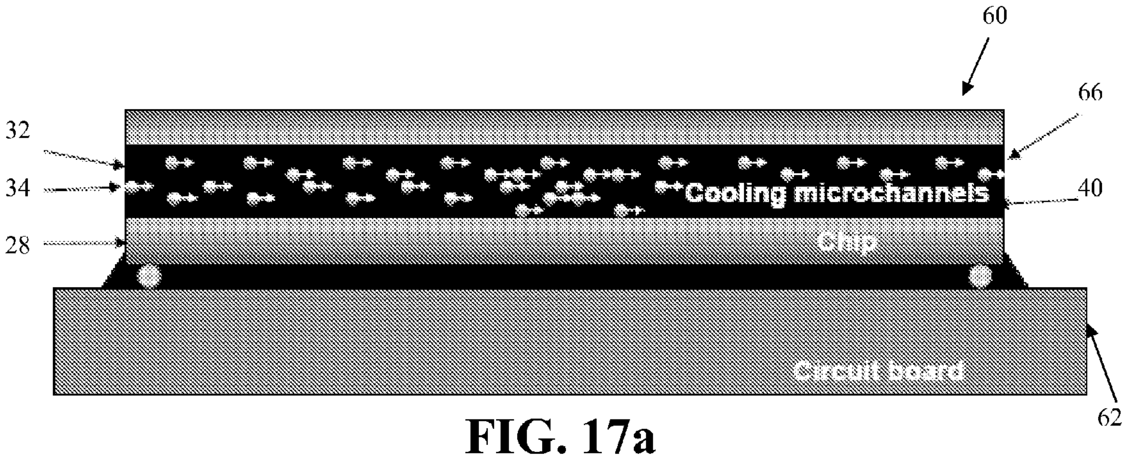
FIG. 17*a* is a schematic representation of another embodiment of the present invention for a microfluid or nanofluid transportation system for cooling a circuit board.

Dielectrophoresis of micro/nanoparticles in some embodiments of the present invention under a non-uniform electric field is used to realize microscale flow actuation through the particle-fluid interaction. This pumping scheme preferably involves no moving parts and therefore, is very reliable over long-term usage. Some embodiments include flexibility in electrode design which allows fine tuning the electromechanical forces on the mover particles. Control of flow velocity magnitude and profile can be obtained in combination with proper flow channel design. When this technique is used to pump nanofluids through integrated microscale cooling systems 60 as shown in FIG. 17, the nanoparticles will act as fluid mover and the superior thermal transport properties of the nanofluids can be explored simultaneously to enhance the heat transfer associated with thermal management of microelectronics.

Some of the various embodiments of the inventions disclosed herein provide a driving force that is controlled by the electrode design and the frequency of the applied electric field for given fluid-particle combination. In addition, the superior thermal transport properties of nanofluids can be explored simultaneously while the suspended nanoparticles act as fluid mover.

Further, although generally spherical particles are shown and described herein, the present invention is not so limited and yet other embodiments contemplate the use of non-spherical particles that can further enhance the inducement of fluid movement by the particles. For certain asymmetric shapes, the induced polarization moment will be enhanced, as will the dielectrophoretic force on the particle. In addition, the viscous drag force may increase yielding more momentum imparted from the particle to the fluid.

In yet other embodiments, the "particle" does not have to be solid. Gas bubbles can be viewed as "soft particles". Various embodiments contemplate using tw-DEP to control the bubble motion in boiling systems, such as the bubble departure size and frequency, etc. For general liquid/gas mixtures, the bubble size is generally beyond one micron and the effect of Brownian motion may not be important.

In various embodiments of the present invention, it is preferred that the particle is polarizable and its dielectric properties be different from the surrounding fluid medium. Some of the materials contemplated for use as nanofluids include the use of particle materials comprising oxides (such as alumina, silica, titania and copper oxide) and carbon nanotubes. Non-limiting examples of fluids include water and organic fluids such as ethanol and ethylene glycol.

The microelectrode array can be strategically designed and the frequency of the applied electric field can be modulated to achieve various flow velocity profiles. When microfluids or nanofluids are used, flow actuation and heat transfer enhancement can be achieved simultaneously without external pumps.

Figure 3A:
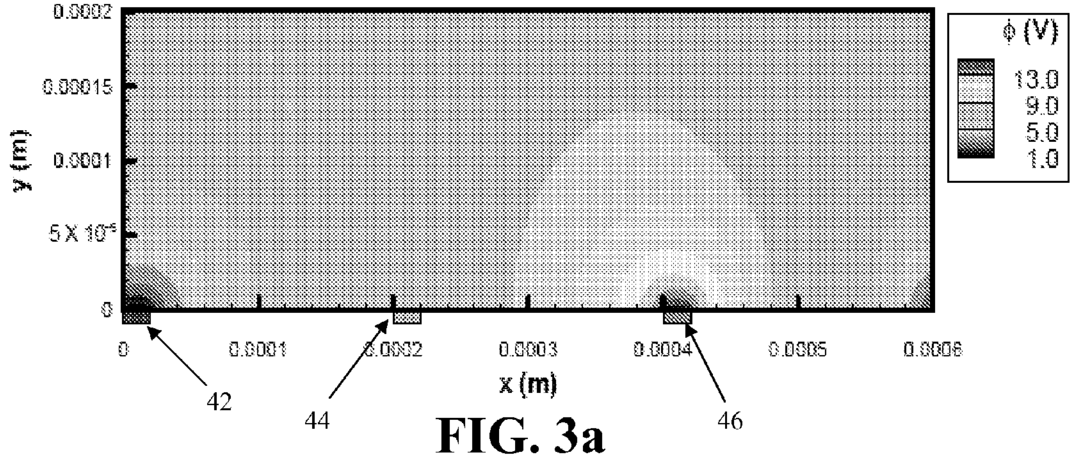
FIG. 3*a* is a graphical depiction of the contour of the electric potential according to one embodiment of the present invention.
Figure 3B:
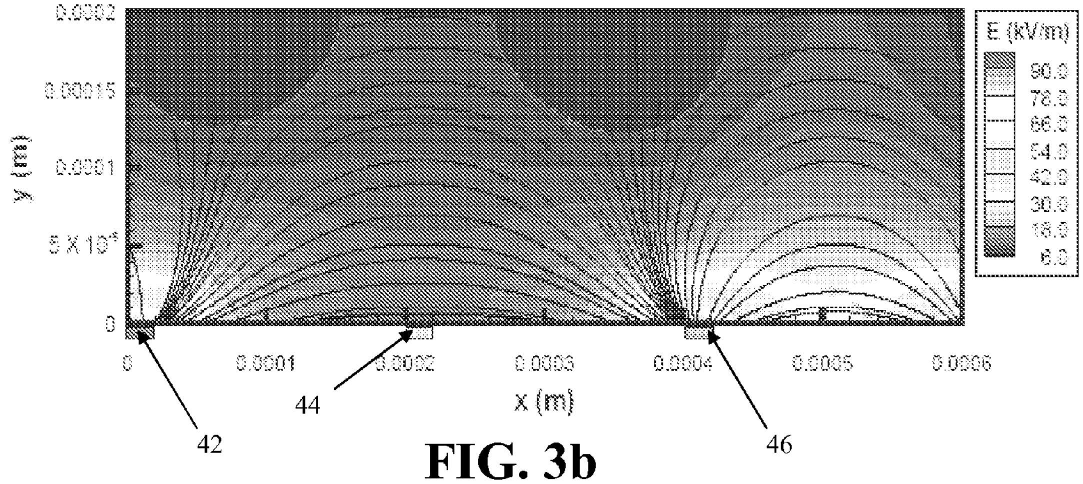
FIG. 3*b* is a graphical depiction of the contour of the electric field (in shades of gray) and also showing field streamlines.
Figure 3C:
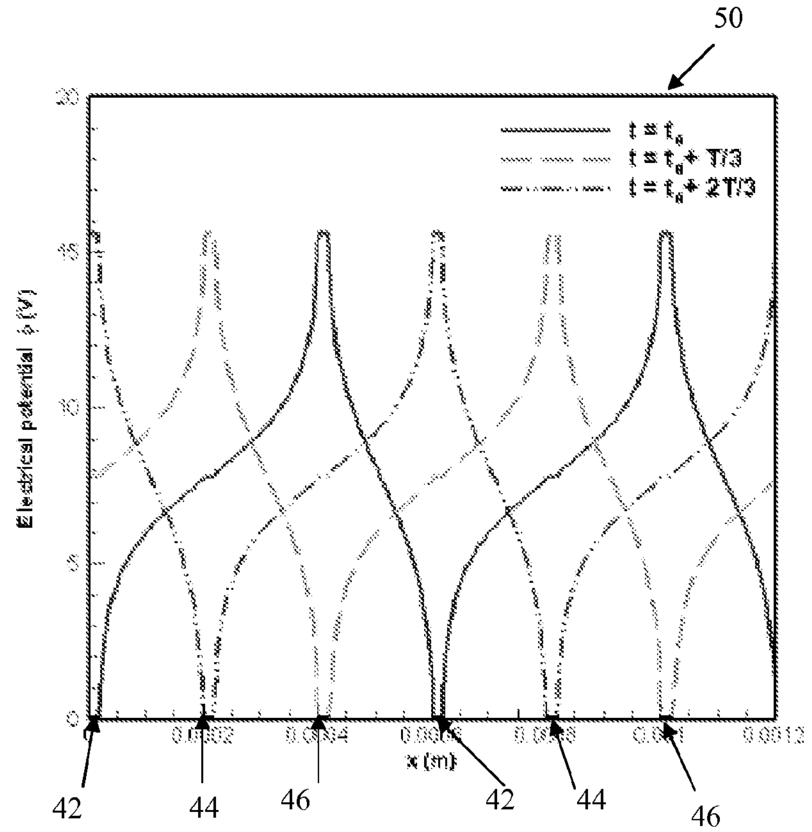
FIG. 3*c* is a schematic representation of the of the electric potential at the electrode surface as applied to arrays of electrodes according to one embodiment of the present invention.

Traveling wave electric signals 50 such as those shown in FIG. 3*c* are applied to an interdigitated microelectrode array 40 (as shown in FIG. 10) to generate the non-uniform traveling wave electric field, which prompts dielectrophoretic forces on the particles 34 with both vertical and transverse components. The time average DEP force is given in the following relationship:

$$\langle \vec{F}(t) \rangle = \pi a^3 \varepsilon_m \left( \underbrace{\frac{\mathrm{Re}[f_{CM}]\vec{\nabla}|\vec{E}|^2}{DEP}} + \frac{2\mathrm{Im}[f_{CM}]\left(E_x^2\vec{\nabla}\varphi_x + E_y^2\vec{\nabla}\varphi_y\right)}{twDEP} \right)$$

The resulting streamlines for negative DEP and traveling wave DEP (twDEP) are shown in FIGS. 3*a* and 3*b*, respectively.

Figure 13A:
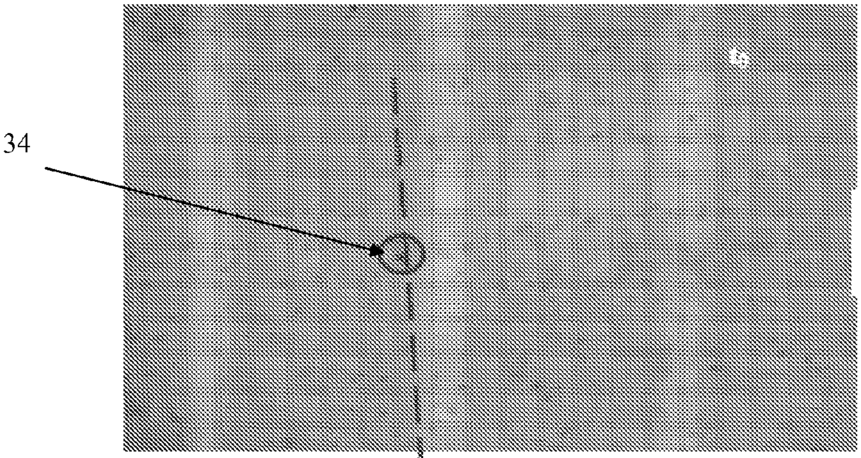
FIG. 13 is a time sequence of three photographs (a), (b), (c) in which the position of a single particle is tracked over time as it crosses over an electrode according to one embodiment of the present invention.
Figure 13B:
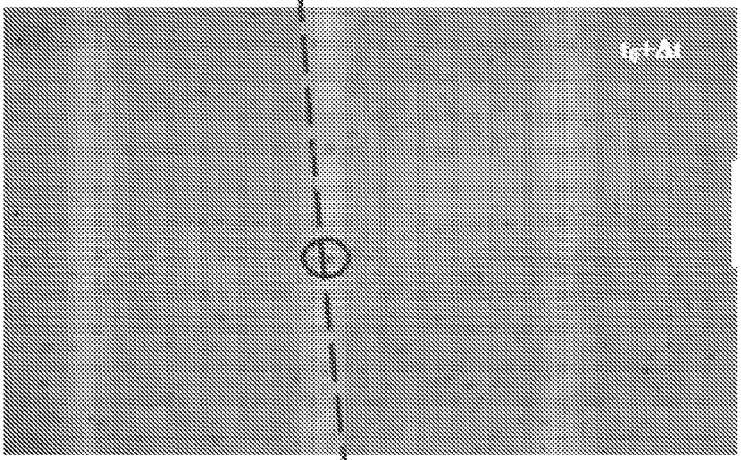
Figure 13C:
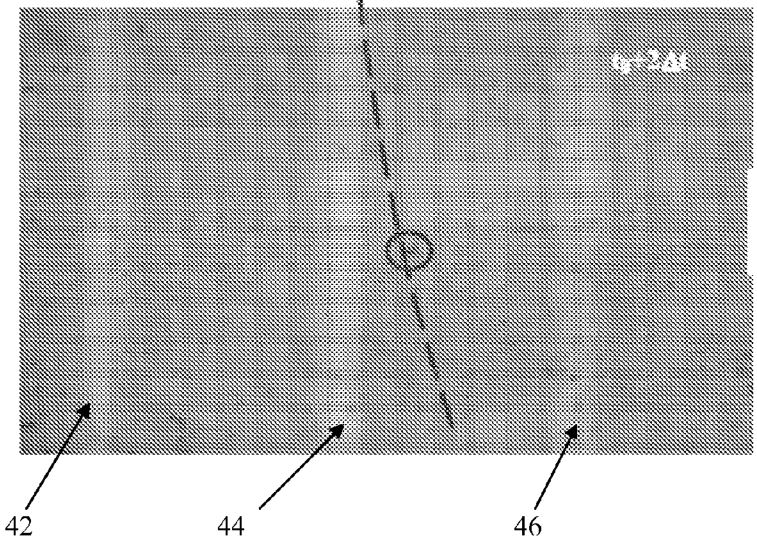

Theoretical analysis and CFD simulation show that, by using this principle, some embodiments of the present invention permit precise flow actuation and control in microfluidic devices. Preliminary experimental results indicate that in one embodiment, an average flow velocity of 100 μm/s can be obtained with a DEP-micropump device 20. FIGS. 10 and 11*a* show photographs of the experimental apparatus. FIG. 13 show the path of a selected particle across an electrode array driven the twDEP force.

FIG. 3*c* is a representation in the spatial domain of the distribution of electric potential on the electrode surface as a result of a wave form 50. The voltages imposed on the electrodes 42, 44, and 46 are controlled with regards to amplitude and frequency. The electrical potential distribution in the area between adjacent electrodes is determined by the insulating boundary condition.

This novel micropumping scheme can be further explored to circulate nanofluids, as shown in FIG. 17, which are suspensions of nanoparticles 34 in base fluids 32, in an integrated microscale cooling systems 60. In such applications, the nanoparticles 34 act as the fluid mover, which eliminates the requirement of conventional external pumps. In some embodiments, the superior thermal transport properties of nanofluids, e.g., very high thermal conductivity, can be utilized to enhance the heat transfer.

In one embodiment of the present invention the nanofluid mixture 30 comprises a colloidal suspension of particles 34 in a liquid 32. In one embodiment the liquid includes 40 percent ethylene-glycol. In yet another embodiment the particles are copper nanoparticles having a characteristic dimension of about 10 nm. Although various specific dimensions, quantities, capacities, and materials are provided herein, these are illustrative only and are not meant to be limiting to any of the embodiments described herein.

In some embodiments of the present invention, the methods and apparatus described herein for pumping of fluids are used to exchange heat between an object a heat sink. In some embodiments, the flow channel provides a linear thermal path between the object and the heat sink, such that the transfer of heat occurs in a direction parallel to the unidirectional flow of particles. However, in yet other embodiments, the arrangement of the thermal path is annular, such that the electric field is applied proximate to either the object or the heat sink. Therefore, the areas of recirculation occur around either the object or the heat sink. The other of the object or heat sink is placed proximate to the opposite channel to the opposite wall of the flow channel, and proximate to the unidirectional flow field. In such embodiments, the flow of heat is generally perpendicular to the unidirectional flow field of particles.

Figure 17B:
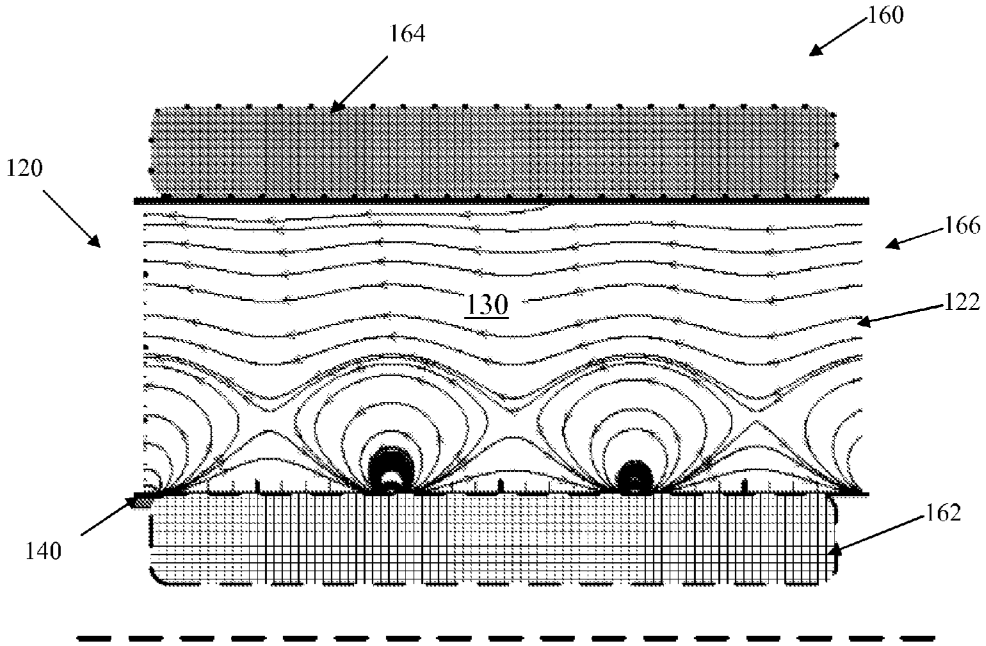
FIG. 17*b* is a schematic representation of another embodiment of the present invention for a microfluid or nanofluid transportation system for exchanging heat between an object and a heat sink.
Figure 17C:
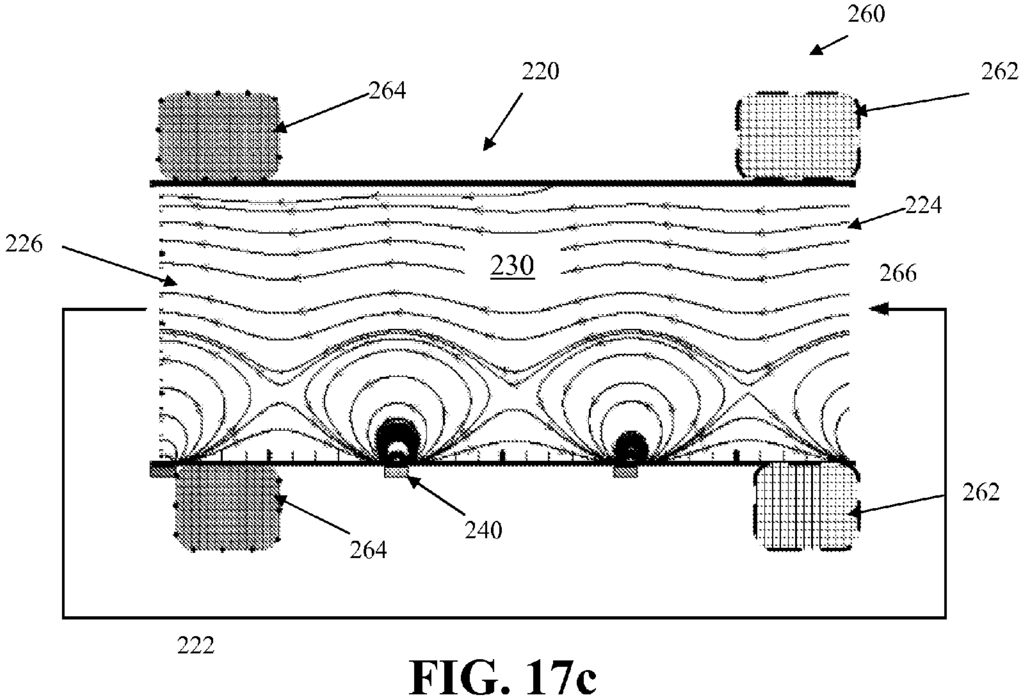
FIG. 17*c* is a schematic representation according to another embodiment of the present invention of a microfluid or nanofluid transportation system for exchanging heat between an object and a heat sink.

FIGS. 17*b* and 17*c* show arrangements for heat exchangers according to other embodiments of the present invention. FIG. 17*b* shows a cooling system 160 which includes a pumping system 120 that is in thermal communication with both a heat source 162 and a heat sink 164 so as to form cooling system 160. Heat source 162 can be any object with which it is desirable to exchange heat with a heat sink. As shown in FIG. 17*b*, the object 162 is in thermal communication with one side of channel 122, and heat sink 164 is shown in thermal communication with the other side of channel 122. In cooling system 160, the exchange of heat is generally perpendicular to the direction 166 in which the fluid media and particles are moving. It is understood that the heat sink 164 can be on either side of the flow channel, opposite to the object 162. In some embodiments, the object 162 and heat sink 160 are located along the outer diameter and inner diameter, respectively, of an annular flowpath, as indicated by the centerline along the bottom of FIG. 17*b*.

FIG. 17*c* shows a cooling system 260 in which the transfer of heat is in a direction generally parallel to the direction 266 in which the media 232 and particles 234 are flowing. However, different from coolant system 160, the object 262 with which heat is being exchanged is displaced axially along the flowpath, and the heat sink 264 is located downstream (or in other embodiments upstream) of the object. As shown in FIG. 17*c*, the mixture 230 that leads the outlet 226 of channel 222 is recirculated back to the inlet 224, as indicated by the line and arrow.

The present work aims to develop an electrokinetic micropumping concept that capitalizes on the DEP-induced hydrodynamic interaction between small particles and the surrounding fluid, and to utilize this concept to devise self-contained microfluidic delivery systems. A detailed analysis of dielectrophoresis and the DEP force is next presented as a basis for the discussion of electromechanical transport. Fundamental aspects of the hydrodynamic interaction between the particles and the surrounding fluid are then discussed and detailed information on the DEP-induced flow field is obtained from numerical analysis. The development of a prototype DEP micropump and experimental characterization of the DEP-induced flow velocity are then reported.

Referring to FIG. 1, re-distribution of the electrical charges in a dielectric particle suspended in a fluid medium upon exposure to an applied external electric field establishes net charges at the interface between the particle and the fluid, and forms an induced dipole across the particle. The induced dipole tends to align with the applied field. The induced dipole moment, $\vec{p}$, and the dielectrophoretic force, $\vec{F}$, are given by $$\vec{p} = 4\pi a^3 \varepsilon_m \left( \frac{\varepsilon_p - \varepsilon_m}{\varepsilon_p + 2\varepsilon_m} \right) \vec{E} \quad (1)$$

$$\vec{F} = (\vec{p} \cdot \nabla)\vec{E} = 2\pi a^3 \varepsilon_m \left( \frac{\varepsilon_p - \varepsilon_m}{\varepsilon_p + 2\varepsilon_m} \right) \nabla \vec{E}^2 \quad (2)$$

in which a is the radius of the particle, $\vec{E}$ is the applied electric field vector, and $\in_m$ and $\in_p$ are the dielectric permittivity of the fluid medium and the particle, respectively. If the applied field is non-uniform $\nabla\vec{E}\neq 0$, the particle will experience a net force and move by the process of dielectrophoresis. DEP takes place in both direct current (DC) and alternating current (AC) electric fields. Sustained particle motion only occurs in AC DEP with the appropriate driving frequencies (in particular, in traveling-wave DEP), for which case, the permittivity in Eq. (2) is replaced by the frequency-related counterpart, $$\tilde{\varepsilon} = \varepsilon - i\frac{\sigma}{\omega} \quad (3)$$

in which $\in$ and $\sigma$ are the permittivity and electrical conductivity of the dielectric materials, and $\omega$ is the angular frequency of the electric field.

While the particle travels via DEP in a surrounding fluid, it suffers a retarding drag force if the fluid is either moving slower than the particle or otherwise stationary. The fluid surrounding the particle is in turn dragged by viscous effects to accelerate in the same direction as the particle. The momentum exchange between the particle and the fluid reduces the velocity lag between the phases and eventually leads to an equilibrium state. A steady flow field is then established around the particle in the fluid as a result of this hydrodynamic interaction. In a particle suspension, a large collection of particles are present and the particles further interact hydrodynamically with neighbors. Consequently, the induced flow field is intensified and an appreciable net flow is produced by the collective pumping action. This is the basic electromechanical transport process underlying the DEP-induced microfluidic pumping technique investigated here.

The AC dielectrophoretic force on the particle is expressed using the frequency-dependent permittivity as $$\vec{F} = 2\pi a^3 \varepsilon_m \left( \frac{\tilde{\varepsilon}_p - \tilde{\varepsilon}_m}{\tilde{\varepsilon}_p + 2\tilde{\varepsilon}_m} \right) \nabla \vec{E}^2 \tag{4}$$

The complex relative permittivity is also referred to as the Clausius-Mossotti factor, $f_{CM}$, $$\tilde{f}_{CM} = \left( \frac{\tilde{\varepsilon}_p - \tilde{\varepsilon}_m}{\tilde{\varepsilon}_p + 2\tilde{\varepsilon}_m} \right) \tag{5}$$

Assuming the electric field varies with a single angular frequency w, the time-averaged dielectrophoretic force can be computed as $$\langle \vec{F}_{DEP} \rangle = \pi a^3 \in_m Re[f_{CM}] \nabla |\vec{E}|^2 + 2\pi a^3 \in_m Im[f_{CM}] (E_x^{\,2} \nabla \Phi_x + E_y^{\,2} \nabla \Phi_y + E_z^{\,2} \nabla \Phi_z) \tag{6}$$

where $Re[f_{CM}]$ and $Im[f_{CM}]$ denote the real and imaginary parts of $f_{CM}$, and $E_x$, $E_y$ and $E_Z$ are components of the electric field vector; $\Phi_x$, $\Phi_y$ and $\Phi_z$ are the phase angles if the electric field is spatially phase-shifted. It is noted that the DEP force depends on the spatial non-uniformities in both the field strength ($\nabla|\vec{E}|^2$) and the phase ($\nabla\Phi$). In fact, the first term on the RHS of Eq. (6) determines the alignment of the DEP force with respect to the maxima/minima of the electric field and is the regular DEP force component in DC DEP. The second term on the RHS of Eq. (6) only appears if the electric field has a spatially varying phase, such as in a traveling-wave field, and therefore is the traveling-wave DEP (twDEP) force component.

Figure 19:
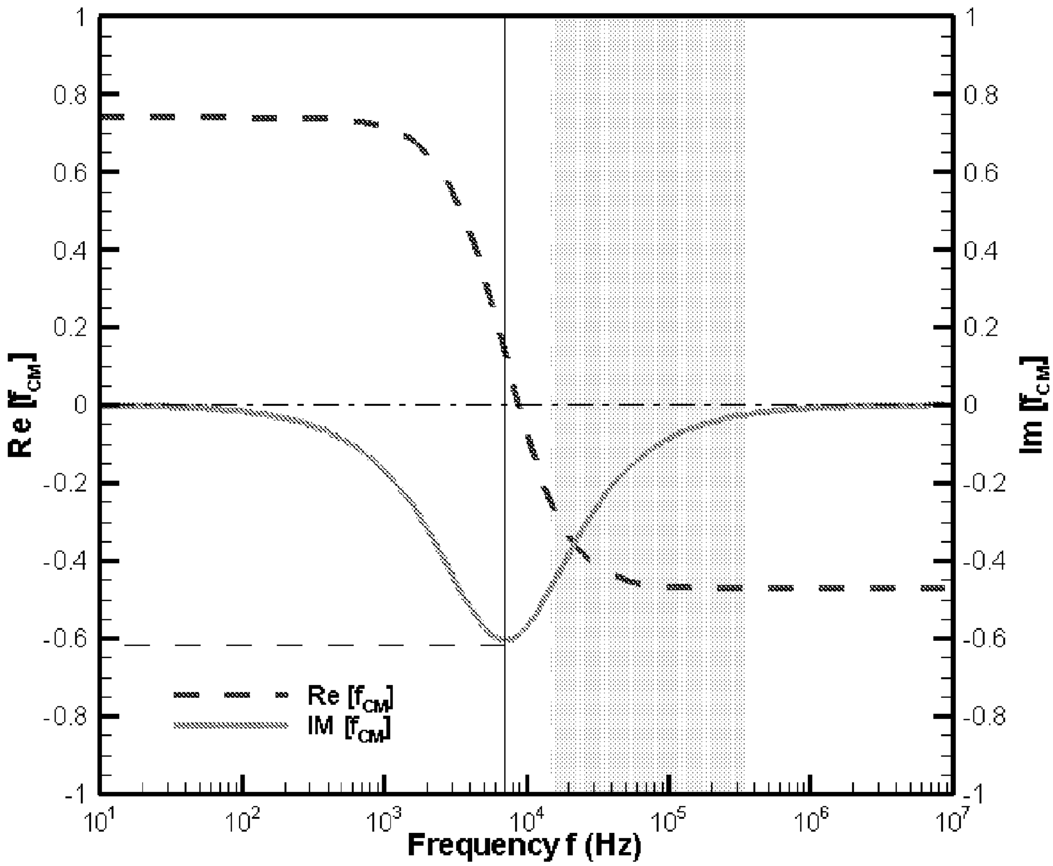
FIG. 19 shows the frequency-dependence of the Clausius-Mossotti factor $f_{CM}$ for a particular particle and fluid media.

The alignment of the DEP force with the applied field is contingent upon the Clausius-Mossotti factor $f_{CM}$ which is frequency-dependent. FIG. 19 illustrates the real and imaginary parts of $f_{CM}$ as a function of the frequency of the applied field for polystyrene particles suspended in water. Clearly, $Re[f_{CM}]$ is positive in the low-frequency range (f<1 kHz) in which the particles are more polarizable than the surrounding fluid, and crosses over to negative values as the frequency increases (f>100 kHz) and the particles become less polarizable than the fluid. If $Re[f_{CM}]>0$, the regular DEP force component aligns favorably with the field strength gradient, as indicated by Eq. (6). As a result, the particles move towards the maxima of the electric field, which are usually located at the edges of the electrodes that are used to generate the electric field, and positive DEP occurs. In the opposite situation, a negative $Re[f_{CM}]$ brings about negative DEP where the particles move away from the maxima of the electric field, distancing themselves from the electrodes. $Im[f_{CM}]$ vanishes at both extremes of the frequency spectrum but assumes non-zero values in the mid-range around the cross-over frequency. When $Im[f_{CM}]$ is not trivial, the resulting twDEP force in Eq. (6) propels the particles along or against the propagating traveling-wave field depending on the sign of $Im[f_{CM}]$. The twDEP force is generally oriented in parallel to the electrode plane. However, in practice, twDEP does not occur in isolation without the companion negative DEP, since the particles must be levitated from the electrode surface. As such, the criteria for effective twDEP are $Re[f_{CM}]<0$ and $Im[f_{CM}]\neq 0$, which are designated by the shaded area on the frequency spectrum in FIG. 19.

The real part of this factor is indicated by the broken line, and the imaginary part is indicated by the solid line. At low frequencies, there is positive DEP, and as a result, particles are attracted onto the electrodes. Above a break frequency of about 10 KHz for the particular fluid and particles, the real part of the CM factor becomes less than 0, and particles are repelled and freed from the electrodes. The shaded region of FIG. 19 indicates a range of frequencies in which tw-DEP is useful for inducing fluid motion by viscus drag. This range of frequencies depends upon the particular combination of fluid and dielectric particle.

The electric field needed for twDEP is often generated by applying a traveling-wave voltage signal to specially designed electrode arrays. In the present study, three-phase, planar parallel electrodes are fabricated on the bottom surface of the flow channel. As shown in FIGS. 20*a* and 20*b*, in one embodiment the electrodes are 9 mm long and have width and uniform spacing of $d_1$=20 μm and $d_2$=180 μm, respectively. The wavelength of the applied voltage signal, in one embodiment of the present invention, is three times the sum of the width and spacing, and in the particular embodiment shown in these figures, is about 600 μm. The fluid and particles are assumed to be homogeneous linear dielectric materials, so that the electric field in the particle suspension in the flow channel can be solved using Laplace's equation.

An insulating layer 48 of Parylene C (thickness 500 nm) present on the electrode array is neglected in the electric field model. Past analytical solutions include approaches using Fourier series, the Green's theorem, and the half-plane Green's function, while semi-analytical methods include the charge density method and the Green's function for a line source with conformal mapping. All these solution approaches have used a linear approximation of the electric potential in the gap between consecutive electrodes as the boundary condition. It will be shown that this is not a good assumption and can cause large errors in the analysis. The calculation can be improved by employing numerical method. Hence, a commercial software package, FLUENT, is used here to simulate the electrical field by solving the scalar transport equations.

The electric potential for an AC field of angular frequency w is $$\phi(\vec{x},t) = \phi_1 \cos(\omega t) + \phi_2 \sin(\omega t) \tag{7}$$

where both $\phi_1(x,y)$ and $\phi_2(x,y)$ satisfy Laplace's equation $\nabla^2\phi=0(i=1,2)$. In the three-phase traveling-wave field, the voltages on consecutive electrodes are phase-shifted by 120°, such that $\phi_2(x, y)=\phi_1(x-\lambda/3, y)$, where the wavelength $\lambda=3(d_1+d_2)$. After solving for the electric potential, the electric field is obtained from $$\vec{E}(\vec{x},t) = -\nabla\phi = \vec{E}_1(x,y)\cos(\omega t) + \vec{E}_2(x,y)\sin(\omega t),$$

where $\vec{E}(x, y)=-\nabla\phi$ and $\vec{E}_2(x, y)=-\nabla\phi_2$

Figure 20:
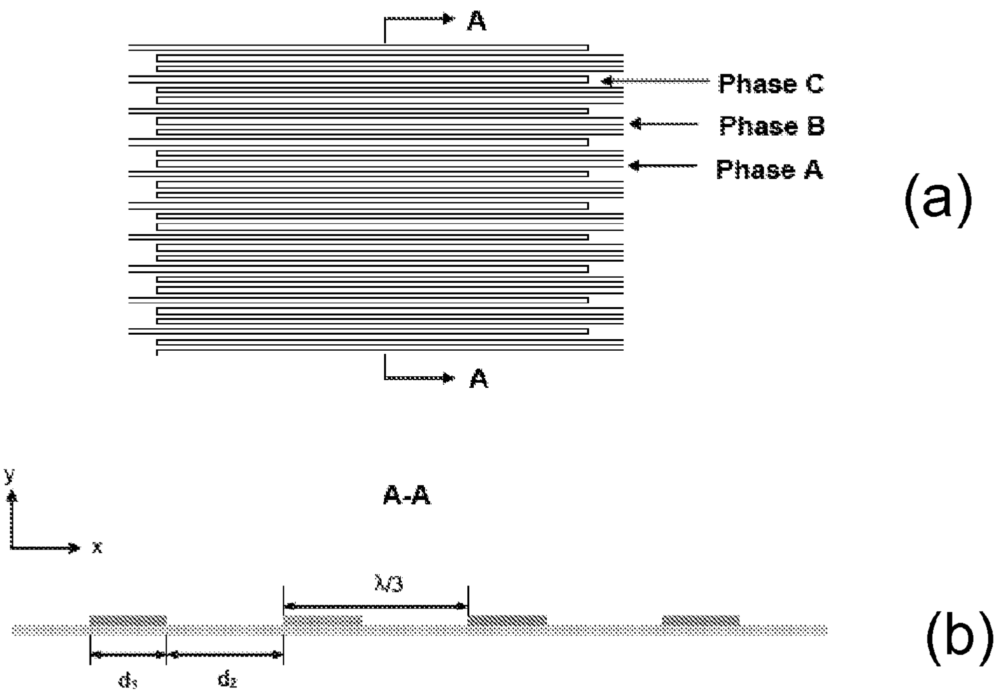
FIG. 20*a* shows a three-phase planar microelectrode array according to one embodiment of the present invention.
FIG. 20*b* is a view of the apparatus of FIG. 20*a* as taken along line A-A of FIG. 20*a*
Figure 21:
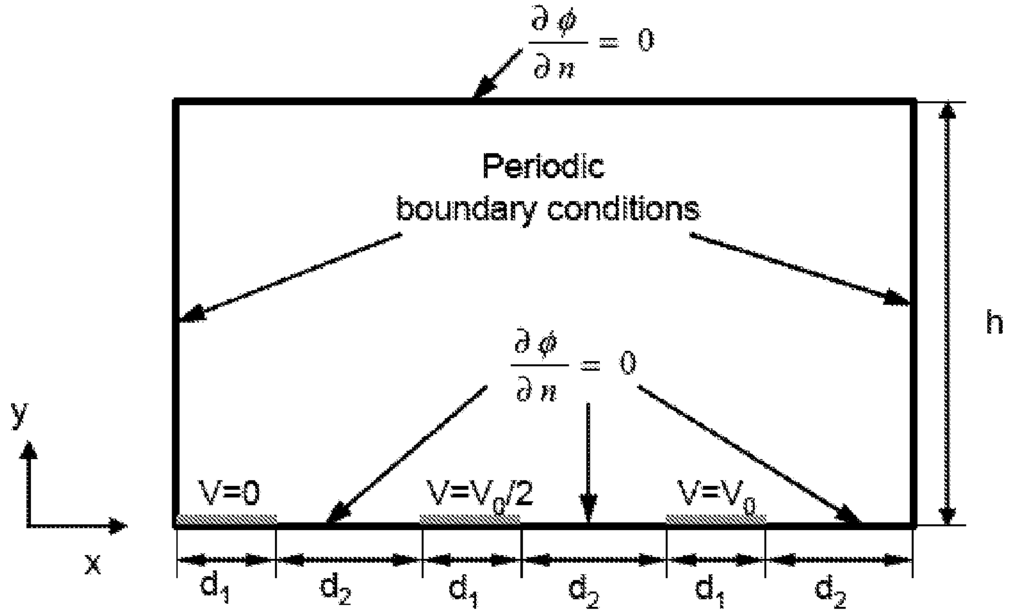
FIG. 21 shows a schematic diagram of the computational domain for the electric field. Boundary conditions are shown for all surfaces. The same configuration is also used in computing the DEP-induced flow field.

For the electrode array used in the present study, the length (9 mm) along the transverse direction (length of the electrodes) can be considered infinite relative to the other two dimensions, as shown in FIG. 20, so that the electrode array is treated as a two-dimensional system. The computational domain and the boundary conditions are illustrated in FIG. 21. This same configuration is also used herein in computing the DEP-induced flowfield. Due to periodicity in the electric field, only a distance along the electrodes of one wavelength is modeled, covering three electrodes and their gaps. Periodic boundary conditions are imposed at the vertical edges of the computational domain shown. On the top surface, which is located at a distance of h=200 mm from the electrode array, a Neumann condition $$\left(\frac{\partial \phi}{\partial n} = 0\right)$$

is assumed since insulating Pyrex glass (dielectric constant, $\in_r$=4.8) is used in the experiments to enclose the flow channel which is filled with water ($\in_r$=78.4). On the bottom surface, the electrodes are represented by sections with specified values of voltages. In the gap regions between neighboring electrodes, the more physically representative Neumann condition is specified for the electric field instead of using a linear approximation.

Numerical results for the electric potential and the electric field are shown in FIGS. 3*a*, 3*b* and 3*c*. The solution presented is for a potential V0 of 15.6 volts. FIG. 3*a* shows that the electric potential decays rapidly with increasing distance from the electrode surface. Since the density of the field lines is proportional to the strength of the electric field, FIG. 3*b* shows clearly that the field maxima are located near the edges of the electrodes. Interestingly, the second-phase electrode does not appear to have an influence in FIG. 3*b* as most field lines bypass this electrode and connect directly between the first- and third-phase electrodes. However, without the second-phase electrode, the phase-angle term would vanish in Eq. (6) and no useful traveling-wave field would be generated for the twDEP application. FIG. 3*c* illustrates the exact solution for the electric potential at the electrode surface, which exhibits significant deviation from the first-order linear approximation often made in past studies in the literature.

Once the traveling-wave electric field is solved, the time-averaged DEP force can be recast in the following form as equation (8):

$$\langle \vec{F}_{DEP} \rangle = \pi a^3 \in_m Re[f_{CM}] \vec{\nabla}(E_{x1}^2 + E_{x2}^2 + E_{y1}^2 + E_{y2}^2) + \pi \in^3 \in_3 Im[f_{CM}](E_{x1} \vec{\nabla} E_{x2} - E_{x2} \vec{\nabla} E_{x1} + E_{y1} \vec{\nabla} E_{y2} - E_{y2} \vec{\nabla} E_{y1})$$

in which $E_{x1}$ and $E_{y1}$ correspond to $\phi_1$, and $E_{x2}$ and $E_{y2}$ correspond to $\phi_2$. As will be seen, the first term which is the regular DEP force component controls the vertical motion of the particle, while the second term which is the traveling-wave DEP force component is responsible for particle motion in the flow direction. These two force components together give rise to the DEP-based microfluidic pumping considered in this work.

Figure 4A:
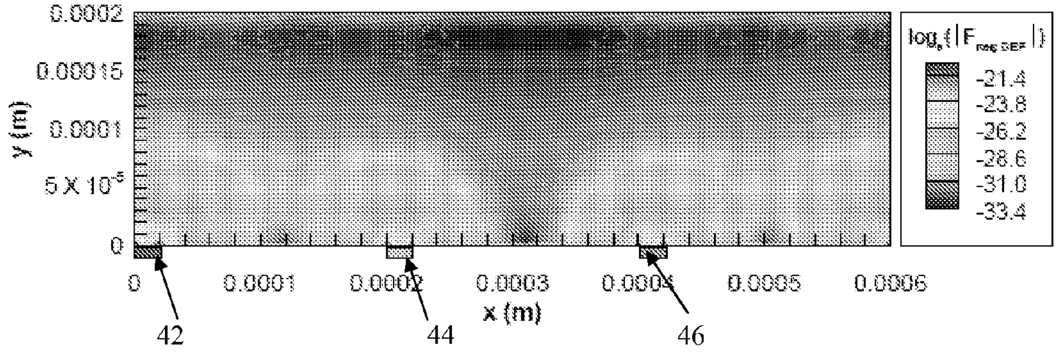
FIG. 4*a* is a shaded graphical depiction of the magnitude of the DEP force for $Re[f_{CM}]=-0.5$ and $Im[f_{CM}]=0$.
Figure 4B:
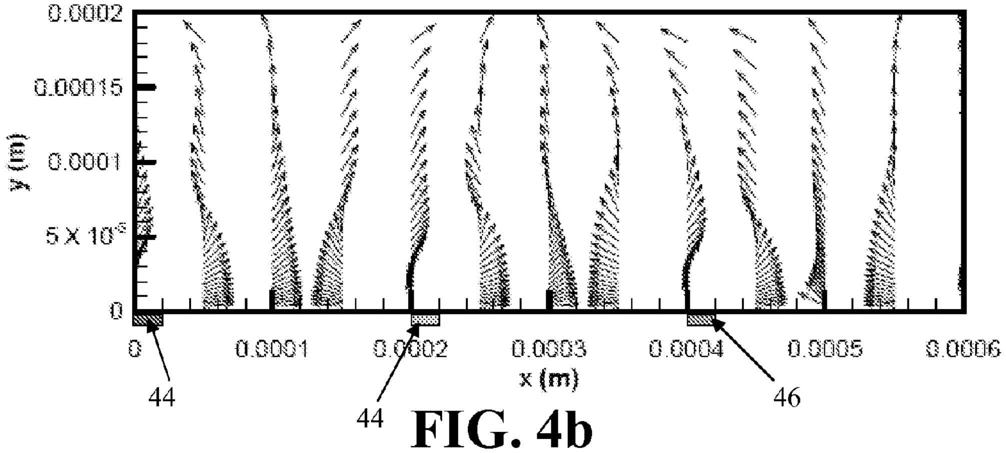
FIG. 4*b* is a graphical depiction of the DEP force vectors (showing only direction, and not magnitude) for the case of FIG. 4*a*.
Figure 4C:
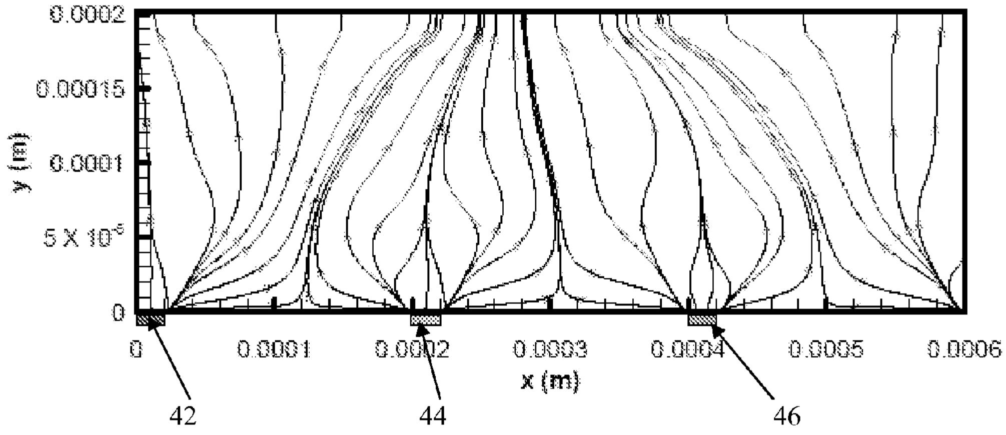
FIG. 4*c* is a graphical depiction of the fluid streamlines for the case of FIG. 4*a*.

Negative DEP is helpful for twDEP to occur. FIG. 4*a* shows contours of the DEP force (in units of N) calculated for a pure negative DEP case, corresponding to $Re[f_{CM}]=-0.5$ and $Im[f_{CM}]=0$, which shows the strength of the DEP force is largely uniform except for regions near the electrodes. FIG. 4*b* indicates that the DEP force points outwards from the electrode edge against the gradient of the electric field. The streamlines in FIG. 4*c* show more clearly that a particle suspended in the fluid tends to be levitated away from the electrode surface.

Figure 5A:
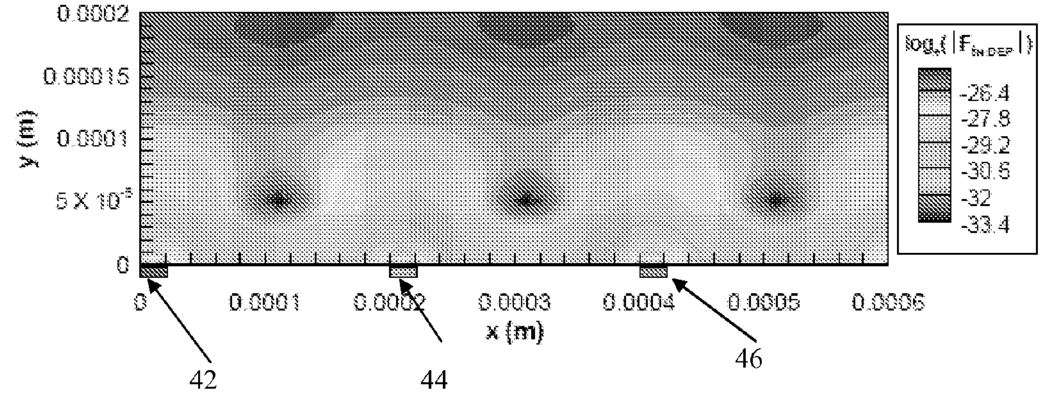
FIG. 5*a* is a shaded graphical depiction of the magnitude of the DEP force for $Re[f_{CM}]=0.0$ and $Im[f_{CM}]=-0.4$
Figure 5B:
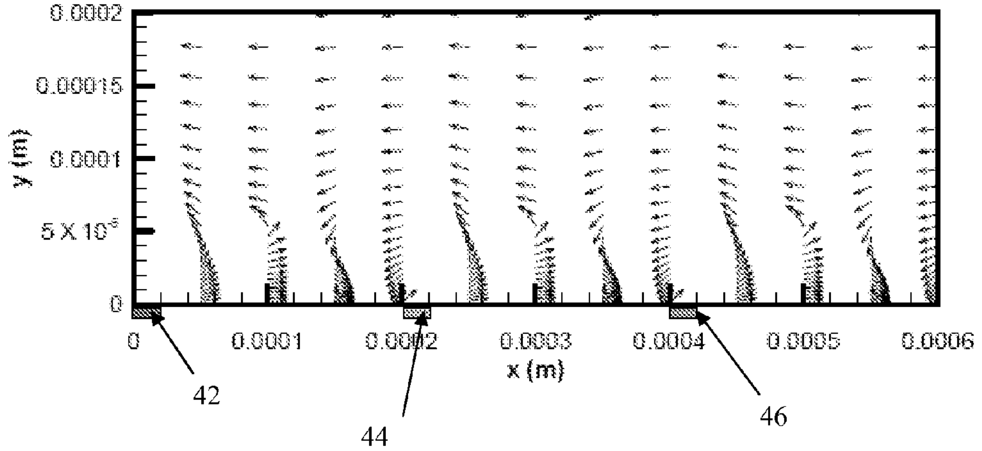
FIG. 5*b* is a graphical depiction of the DEP force vectors (showing only direction, and not magnitude) for the case of FIG. 5*a*.
Figure 5C:
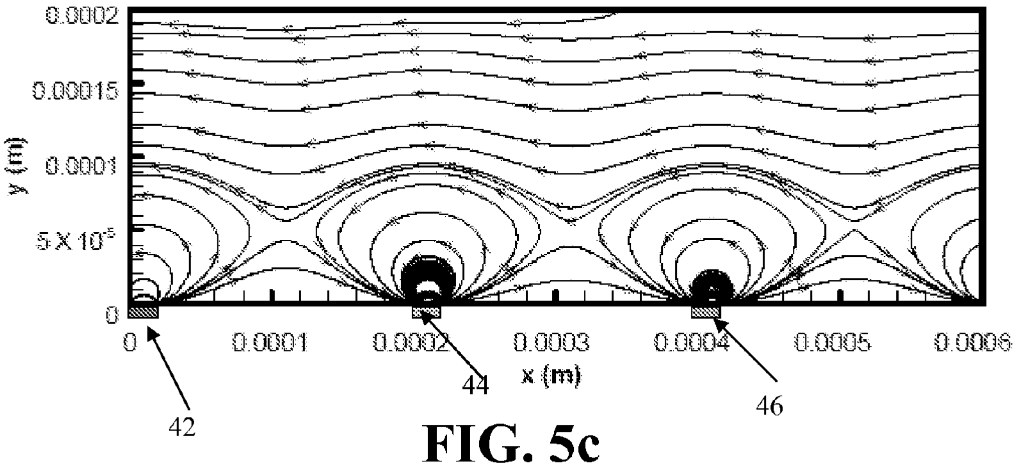
FIG. 5*c* is a graphical depiction of the fluid streamlines for the case of FIG. 5*a*.

In a three-phase traveling-wave field, the spatially varying phase makes the horizontal motion of the particle possible. FIG. 5 illustrates the pure twDEP force (in units of N) and the streamlines corresponding to $Re[f_{CM}]=0$ and $Im[f_{CM}]=-0.4$. FIG. 5*a* shows a periodic profile for the DEP force strength, in contrast to that in the case of negative DEP (FIG. 4*a*), which is consistent with the traveling-wave nature of the field. FIG. 5*b* illustrates that at some height above the electrode surface, the twDEP force becomes nearly uniform in magnitude and acts against the propagating traveling wave in the horizontal direction. At lower heights, trajectories of the particle would no longer conform to translational motion and vortices can be found between the electrodes as evident from the streamline plot in FIG. 5*c*. FIG. 5*c* shows the area of recirculation created proximate to the electrodes by the tw-DEP field.

Figure 3D:
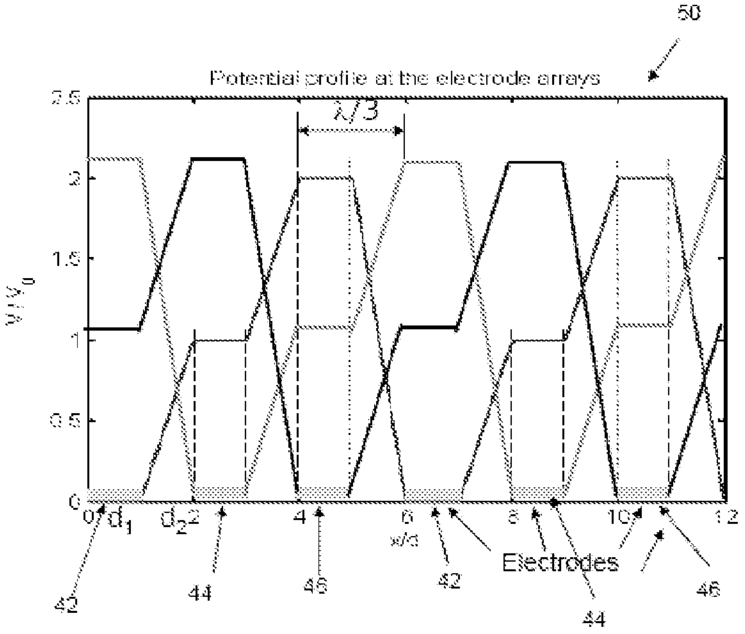
FIG. 3*d* is a schematic representation of a voltage waveform as input to the electrodes according to one embodiment of the present invention.

It should be noted that the electric field and the DEP force field obtained from Eqs. (7) and (8) are only approximate, since the voltage signals applied to the electrodes are not truly sinusoidal traveling waves, as shown in FIG. 3*c*. Therefore, the foregoing treatment captures only the first-order effects of the imposed electric field, however, it represents a reasonable approximation as will be seen from the agreement between the velocity field obtained from this simulation and the experimental measurement. FIG. 3*d* is a graphical depiction of a voltage waveform applied by a signal generator to the electrodes in one embodiment of the present invention.

Particle-fluid hydrodynamic interactions are found to the DEP-induced micropumping concept described here. A particle experiences a variety of external forces as it travels in the surrounding fluid. The single particle dynamics can be described by the Langevin equation, $$m\frac{d^2\vec{r}}{dt^2} = \vec{F}_G + \vec{F}_{DEP} + \vec{F}_v + \vec{R}(t) + \sum \vec{F}_{add}^{i,j} \quad (9)$$

in which the gravitational force is $$\vec{F}_G = \frac{4}{3}\pi\alpha^3(\rho_p - \rho_f)\vec{g},$$

the time-averaged DEP force $\vec{F}_{DEP}$ is given by Eq. (4), the viscous drag force is described by Stokes' drag law $\vec{F}_v = 6\pi\mu_f a(\vec{u}_m - \vec{u}_p)$, and the random Brownian force is $\vec{R}(t)$ for which the diffusion coefficient is $D_B = k_B T/(6\pi\mu_f a)$. The additional terms $\vec{F}_{add}^{i,j}$ arise in a suspension of multiple particles and account for the electrical interactions between neighboring particles. In the experiments for the present work, generally spherical polystyrene particles 34 ($\rho_p$=1050 kg/m$^3$) of 2.9 μm diameter were used at a low concentration in an aqueous solution ($\rho_p$=1000 kg/m$^3$). Therefore, the gravitational force, the Brownian force and the forces due to multi-particle electrical interactions can be neglected according to a dimensional analysis. Consequently, the Langevin equation is simplified to $$m\frac{d\vec{u}_p}{dt} = \vec{F}_{DEP} - 6\pi\mu_f a(\vec{u}_m - \vec{u}_p) \quad (10)$$

Solving this equation provides the particle velocity $$\vec{u}_p = \left(\frac{\vec{F}_{DEP}}{6\pi\mu_f a} + \vec{u}_m\right)\cdot\left(1 - e^{-\frac{6\pi\mu_f a}{m}t}\right) \cong \frac{\vec{F}_{DEP}}{6\pi\mu_f a} + \vec{u}_m \quad (11)$$

The inertia term can be neglected because the relaxation frequency $$f = \frac{6\pi\mu_f a}{m} \sim 10^7.$$

Hz is higher than the frequency of the applied electric field (~$10^5$ Hz). Clearly, the competition between the DEP force and the viscous drag determines the velocity lag between the particle and the fluid. At equilibrium, both forces should balance each other. If the viscous drag is exceeded by the DEP driving force, the particles accelerate until a new equilibrium is established.

The dielectrophoretic particle motion perturbs an otherwise stationary fluid and generates a local flow field in the particle's vicinity, which can be described by Stokes' equation, $$\nabla^2 \vec{V} = \frac{1}{\mu_f} \nabla p \tag{12}$$

For simplicity, the torque on the particle due to stresses exerted by the surrounding fluid is not considered, and therefore the angular momentum does not play a role in the flow field.

The Stokes equation must be solved in conjunction with the continuity equation as well as the no-slip boundary condition at the surface of the particle, $$\nabla \cdot \vec{V} = 0 \tag{13}$$

$$\vec{V} = \vec{u}_p \text{ at the surface of the particle} \tag{14}$$

Figure 7:
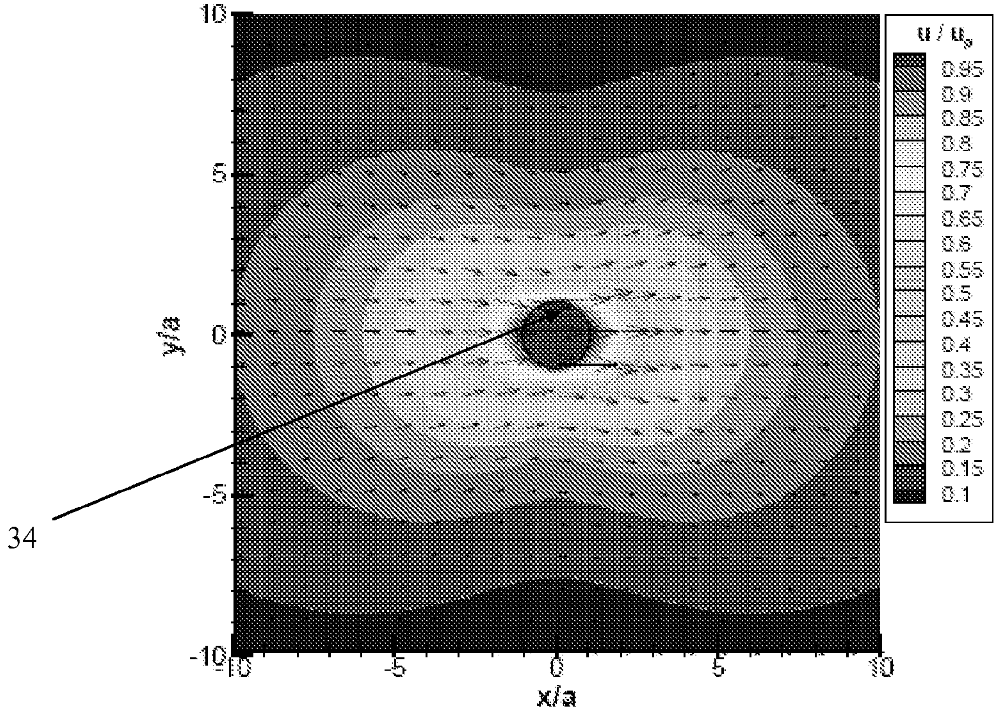
FIG. 7 is a solution of the velocity field around a translating particle. The circle designates the particle which is translating from left to right. The magnitude of the velocity field is indicated by the shades of gray.

The resulting velocity field is plotted in FIG. 7, where the velocity is normalized with the particle velocity up. Particle 34 is translating from left to right. It is seen that, immediately around the particle, the fluid elements attain a velocity almost equal to $u_p$, as expected. However, the agitation the particle causes in the fluid extends well beyond its vicinity. The entire fluid domain in the plot is influenced, extending over an area of 20$a$×20a which is roughly 100 times larger than the particle size. The fluid in most of the domain reaches a velocity of at least $u_p/10$. It is thus clear that a single particle can induce an appreciable flow field over a region considerably larger than its own size.

Figure 6:
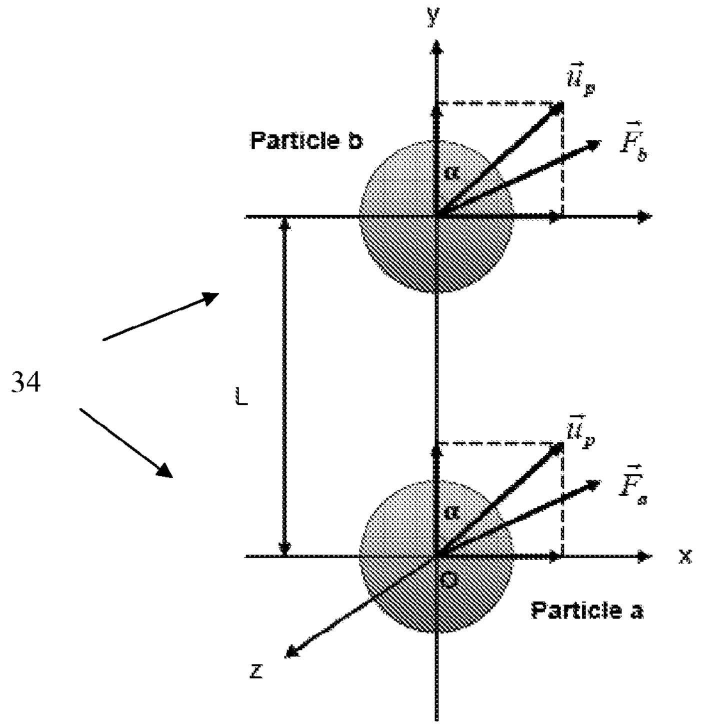
FIG. 6 is a schematic representation of forces acting on a two particle system and the particle velocities.

In colloidal suspensions where multiple particles are present, additional hydrodynamic interactions between neighboring translating particles could result in an intensification of the induced flow field. The extent of this kind of hydrodynamic interaction depends on many factors such as the particle shape and size, the inter-particle distance and the respective orientation of the particles. Consequently, the flow field induced by the collective motion of a group of particles will differ from that due to a single particle. In view of the difficulty in obtaining analytical solutions for a multiple-body problem, the method of reflections is used; successive iterations are employed to solve the flow field to any degree of approximation by this method. The drag forces can be derived for a pair of identical particles separated by a distance L, as shown in FIG. 6 for the simplest case of a multiple-body system, $$F_{\mu,x} = \frac{6\pi\mu_f a u_p \sin\alpha}{1 + (3/4)(a/L)} \tag{15}$$

$$F_{\mu,y} = \frac{6\pi\mu_f a u_p \cos\alpha}{1 + (3/2)(a/L)} \tag{16}$$

The particles in this case are considered to move with the same velocity along a direction at an angle a to the line joining their centers.

The equations reveal that the drag force experienced by each particle in the pair is strongly affected by the inter-particle distance. If the two particles are very far apart (L→∞), the particle-particle interaction can be neglected and the drag force reduces to the prediction from Stokes' drag law. As the inter-particle distance decreases, the drag force decreases from the Stokes' drag law value, as indicated by the term in the denominator in Eqs. (15) and (16). This is because the motion of particle a induces a flow velocity at the position of particle b, which helps to reduce the velocity lag between particle b and its surrounding, and leads to lower viscous drag on particle b, and vice versa. However, the DEP force on the particles is not affected by their relative positions. As stated earlier, the imbalance between the unaffected DEP force and the waning viscous drag will accelerate the particles to a higher velocity until a new equilibrium is reached. Consequently, the induced flow field is intensified.

Figure 8A:
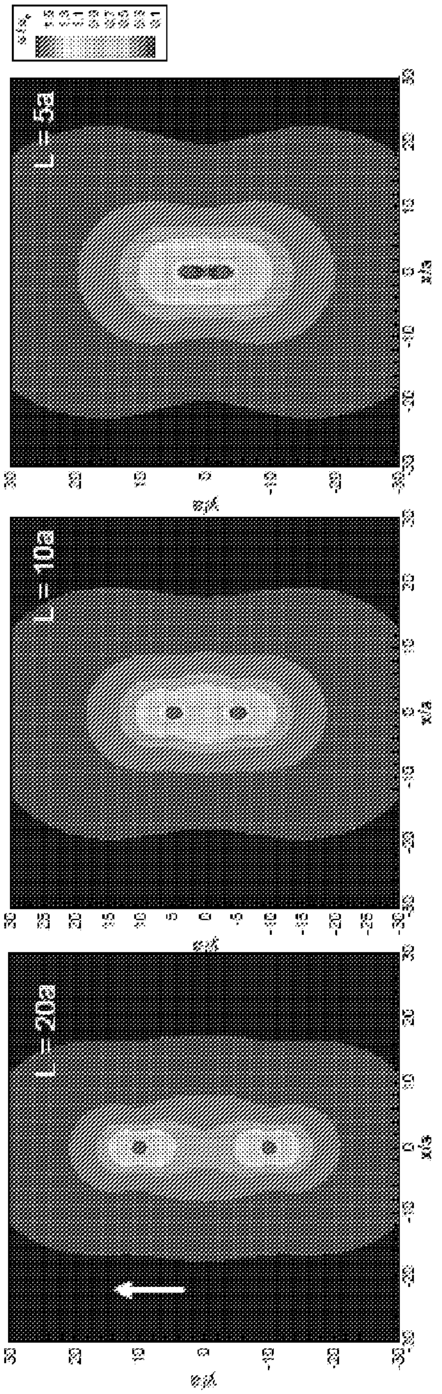
FIG. 8*a*: Enhancement of induced flow due to the hydrodynamic interaction between neighboring particles (the particles move from left to right at the same velocity $u_p$).
Figure 8B:
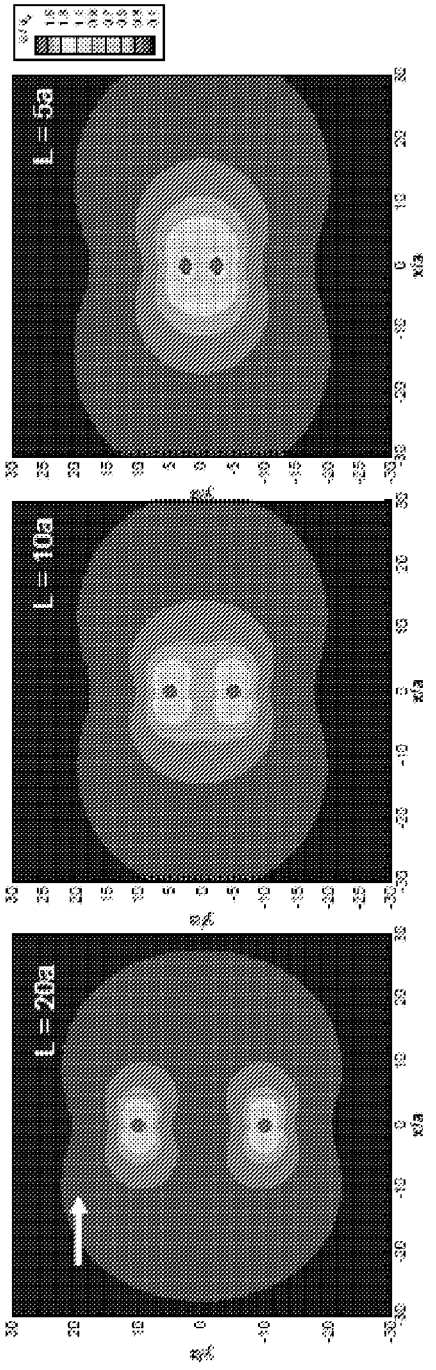
FIG. 8*b* shows the enhancement of induced flow due to the hydrodynamic interaction between neighboring particles moving perpendicular to the line joining their centers (the particles move from left to right at the same velocity $u_p$).

Knowing the particle velocity and the drag force from Eqs. (8), (15) and (16), the flow field at the new equilibrium state can be deduced using the point-force approach. The results are shown in FIG. 8 for two specific situations. The two particles are modeled to be identical size (with a radius r=a), and separated from each other by a distance L (which is a multiple of a). Each particle is moving at the same velocity. In FIG. 8$a$, the particles are moving along the line joining their centers, that is, α=0; and in FIG. 8$b$, the particles are moving perpendicular to the centerline, that is, α=90°. For both cases, the inter-particle distance is decreased to explore the effect of this parameter on the induced flow field. Indeed, the flow fields are found to be enhanced, which can be attributed to two sources: the larger particle velocity due to the reduced viscous drag as a result of the particle-particle interaction, and the superposition of flow fields due to the individual particles. As the interparticle distance is decreased, the flow field intensifies.

Figure 9A:
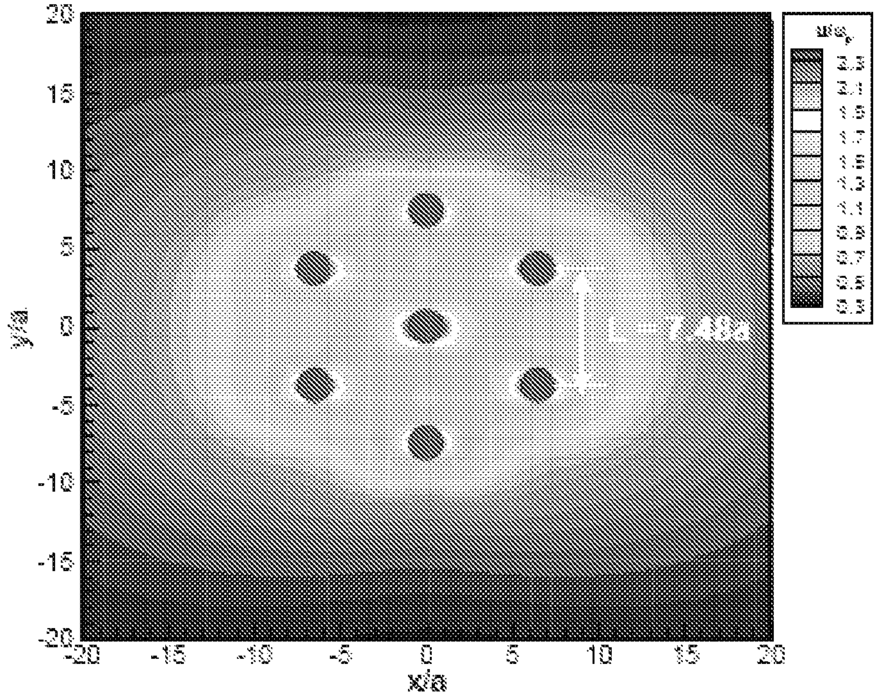
FIG. 9*a* graphically depicts the velocity field enhancement due to increasing particle concentration for a particle separation of L=7.48a (the particles move from left to right at the same velocity $u_p$).
Figure 9B:
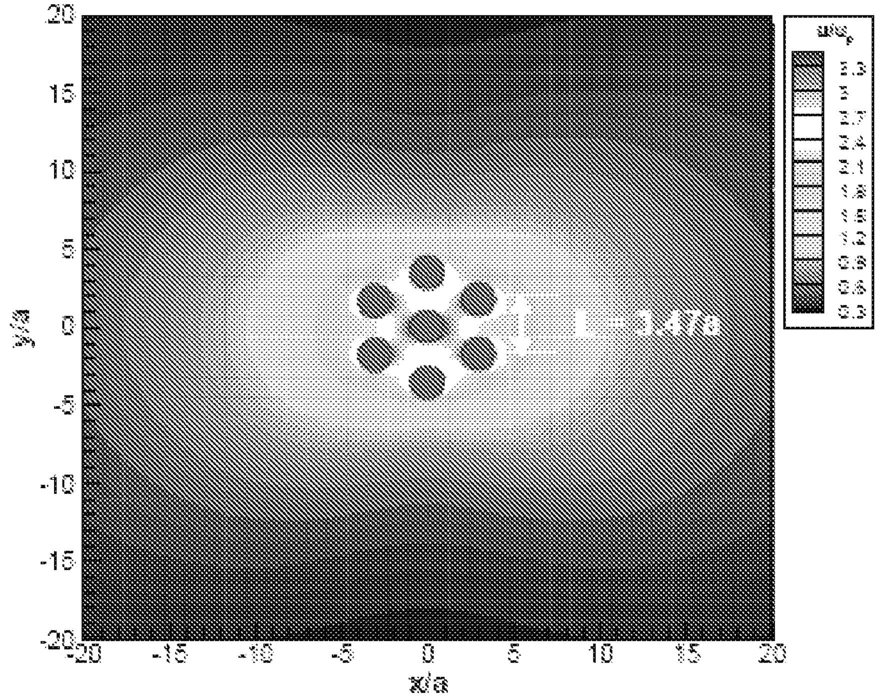
FIG. 9*b* graphically depicts the velocity field enhancement due to increasing particle concentration for a particle separation of L=3.47a (the particles move from left to right at the same velocity $u_p$).

For a large number of particles, it is infeasible to study the hydrodynamic interaction and the flow field enhancement analytically. However, an estimate can be obtained by examining the superposition of flow fields due to individual particles in the suspension, which would provide an underestimate of the enhanced velocity field since the hydrodynamic interaction represented in Eqs. (15) and (16) is neglected. FIG. 9 illustrate such flow fields induced by multiple-particle motion in suspensions. Since the inter-particle distance is related to particle volume concentration, FIG. 9$a$ shows that the maximum velocity has increased to 3.3 times that of an individual particle at the higher particle concentration (L=7.48a), compared to an increase of 2.3 times at the lower particle concentration (L=3.47a) (for FIG. 9$b$).

The analysis in this section indicates the feasibility of generating substantial flow velocities based on hydrodynamic interactions between particles.

Figure 2:
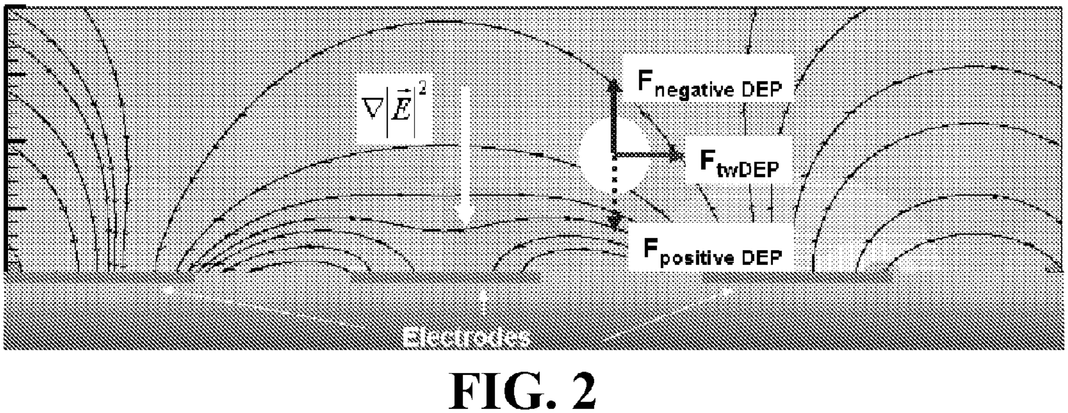
FIG. 2 is a schematic representation according to one embodiment of the present invention of a traveling wave DEP (twDEP) force that propels the particle moving in the horizontal direction.

The twDEP is modeled theoretically by (6), and the resulting electric field and DEP forces on the particle are shown in FIG. 2. The transverse component of DEP force (the twDEP component) balances the viscous drag force and controls the horizontal motion of the particles, therefore being the driving force for various embodiments of the micropumping scheme disclosed herein. The flow field under the influence of the particle motion can be solved analytically. Enhancement in the velocity field due to multi-particle interactions can be observed from the maximum magnitude of the fluid velocity. CFD simulation further quantifies the flow field that can be expected from a DEP pump according to one embodiment of the present invention, and the velocity profile is illustrated in FIG. 13.

DEP and the induced flow field were analyzed above with simplified particle-fluid systems to elicit an understanding of the DEP driving force and the particle-fluid interaction as a mechanism for microfluidic actuation. However, it is difficult to extend this analysis to general particle suspensions due to the complexity of solving a problem with the simultaneous presence of many particles. Hence, a numerical model is developed to study the flow physics for particle suspensions and to extract detailed information of the DEP-induced flow field.

The computational domain for the numerical model is shown in FIG. 21. The electric and the flow fields are decoupled from each other and solved sequentially using a commercial software package, FLUENT. The solution of the electric field has been described earlier, and yields the DEP forces. The DEP force is computed for every point in space. However, only if a particle passes by a fluid element, will there be a force acting on the fluid. Since the particles are present discretely in space, the DEP force is also dispersed in the fluid. However, there are ample particles in the suspension and their random passage in space makes their presence ergodic. As such, the DEP force, although actually acting on the discrete particles, can be treated as a continuous body force in the fluid by volume-averaging. In other words, the DEP force on one particle is averaged over the fluid volume surrounding the particle with the size of the averaging volume determined by the particle volume fraction. This DEP force is then introduced as a body force in the Navier-Stokes equations to solve for the induced flow field. By following this procedure, the complex solid-liquid two-phase flow problem is converted to a more straightforward single-phase fluid flow problem.

The computational domain used for the flow field simulation is shown in FIG. 21. Periodic velocity boundary conditions are specified at both ends of the domain along the x-direction, and no-slip boundary conditions are assumed for the top and bottom walls. The convective term is discretized using a first-order upwind scheme. The computational domain is discretized using a 600×200 (x-y) grid. Simulations with different grids showed a satisfactory grid-independence for the results obtained with this mesh. The simulations are performed for 15 cases to study the effects of varying the frequency and voltage of the applied field on the induced flow field. The simulation matrix is shown in Table 1. The inter-particle distance is maintained at L=8a for all cases, which corresponds to the actual spacing for a particle concentration of ~1%. For the selected frequencies, the particles experience both negative and traveling-wave DEP forces.

TABLE 1

Numerical simulation matrix

| f (kHz) | $Re[f_{CM}]$ | $Im[f_{CM}]$ | V (Volt) |
|---|---|---|---|
| 10 | −0.008 | −0.562 | 10 |
| 10 | −0.008 | −0.562 | 15.6 |
| 10 | −0.008 | −0.562 | 22 |
| 10 | −0.008 | −0.562 | 28.6 |
| 10 | −0.008 | −0.562 | 50 |
| 50 | −0.451 | −0.162 | 10 |
| 50 | −0.451 | −0.162 | 15.6 |
| 50 | −0.451 | −0.162 | 22 |
| 50 | −0.451 | −0.162 | 28.6 |
| 50 | −0.451 | −0.162 | 50 |
| 100 | −0.468 | −0.0823 | 10 |
| 100 | −0.468 | −0.0823 | 15.6 |
| 100 | −0.468 | −0.0823 | 22 |

TABLE 1-continued

Numerical simulation matrix

| f (kHz) | $Re[f_{CM}]$ | $Im[f_{CM}]$ | V (Volt) |
|---|---|---|---|
| 100 | −0.468 | −0.0823 | 28.6 |
| 100 | −0.468 | −0.0823 | 50 |

Figure 18:
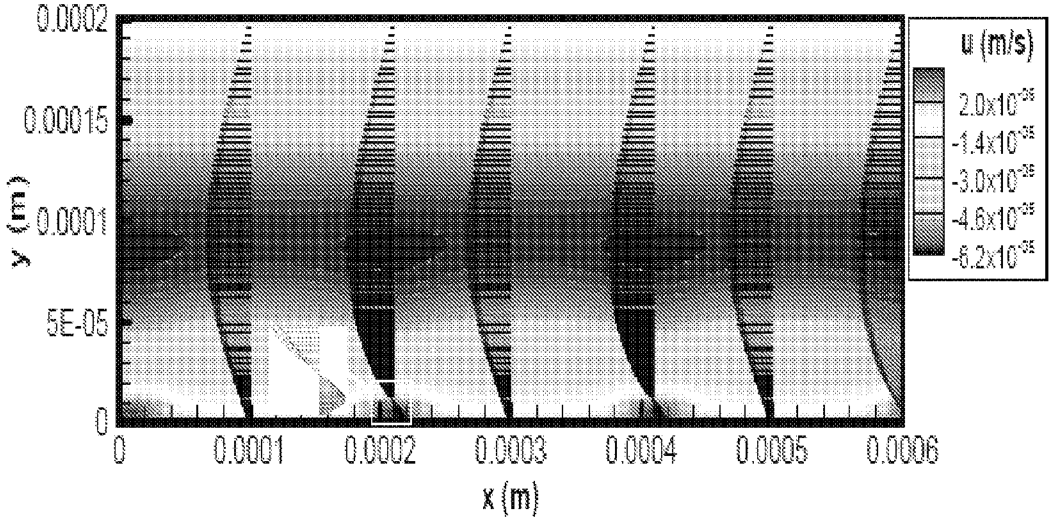
FIG. 18 shows DEP-induced velocity profiles at various streamwise locations according to one embodiment of the present invention. The frequency of the applied signal is f=10 kHz and the voltage is $V_0$=28.6 V.

FIG. 18 shows the DEP-induced velocity field in the flow channel for the case where the frequency of the applied signal is 10 KHz and the applied voltage is 28.6 volts. Velocity profiles at various streamwise locations resemble the parabolic shape of pressure-driven flows. However, the profiles are asymmetric along the y-direction with appreciable distortions in regions right above the electrodes. Reverse flows also occur in the near-wall area, as indicated by the inset in the velocity contour plot. Velocity profiles of this type differ from other electrohydrodynamic flows, such as the plug profile observed in electroosmotic flows. This difference is related to the traveling-wave DEP force shown in FIG. 5, which demonstrates an almost constant driving force in the bulk fluid, similar to pressure-driven flows, except for regions near the electrodes, where there is recirculation.

Figure 15:
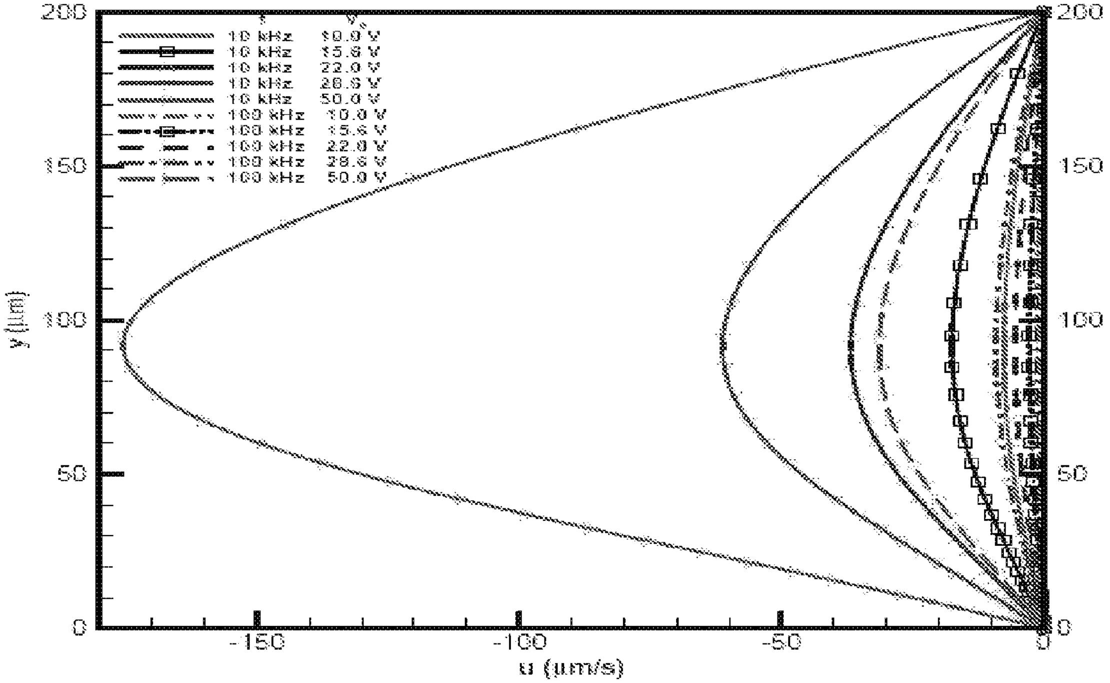
FIG. 15 shows a computed velocity profile at the midway location in the direction of flow (x=0.0003 m) for selected conditions according to one embodiment of the present invention.

Flow velocities at the midway location of the flow channel (x=0.0003 m) are plotted in FIG. 15 for selected cases. For a given frequency, the velocity increases with increasing applied voltage as a result of the enhanced driving forces. However, modulating the frequency of the electric field appears to be a far more effective way to increase the flow velocity. For instance, the induced velocities at 10 kHz even at lower voltages (22 and 22.8 V) exceed that at the maximum voltage (50 V) at 100 kHz.

Experiments have been performed on a prototype DEP-based micropump device, as shown in FIG. 7*a*. Measurements of the velocity field are obtained for polystyrene microparticles (2.9 μm/diameter) suspended in water, using microparticle image velocimetry technique, shown in FIG. 10*a*. The results for average velocity at various applied voltages and frequencies are plotted in FIG. 10*b*.

Figure 10A:
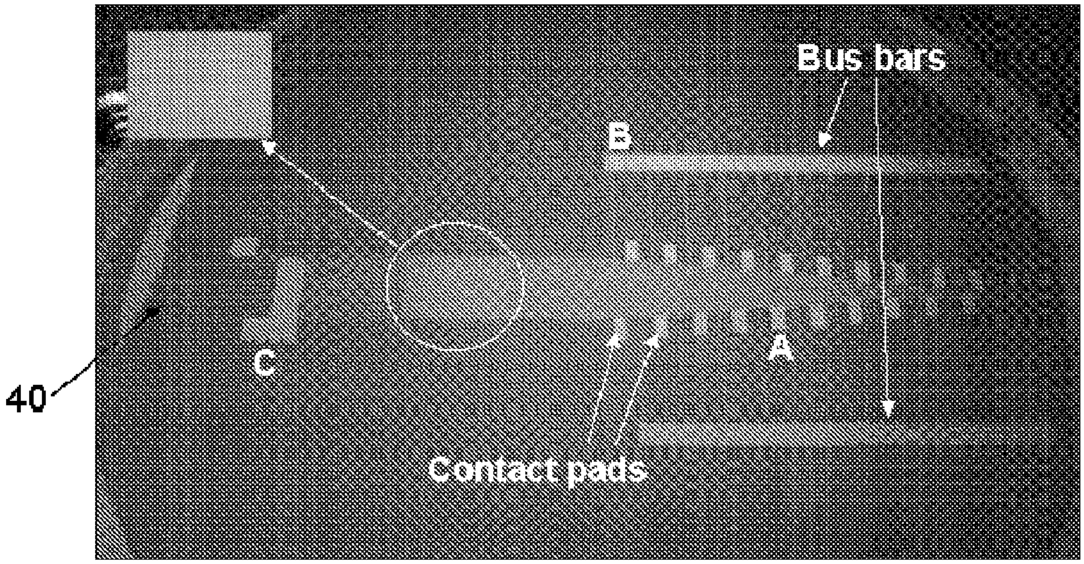
FIG. 10*a* is a photograph of a traveling wave DEP device according to one embodiment of the present invention.
Figure 10B:
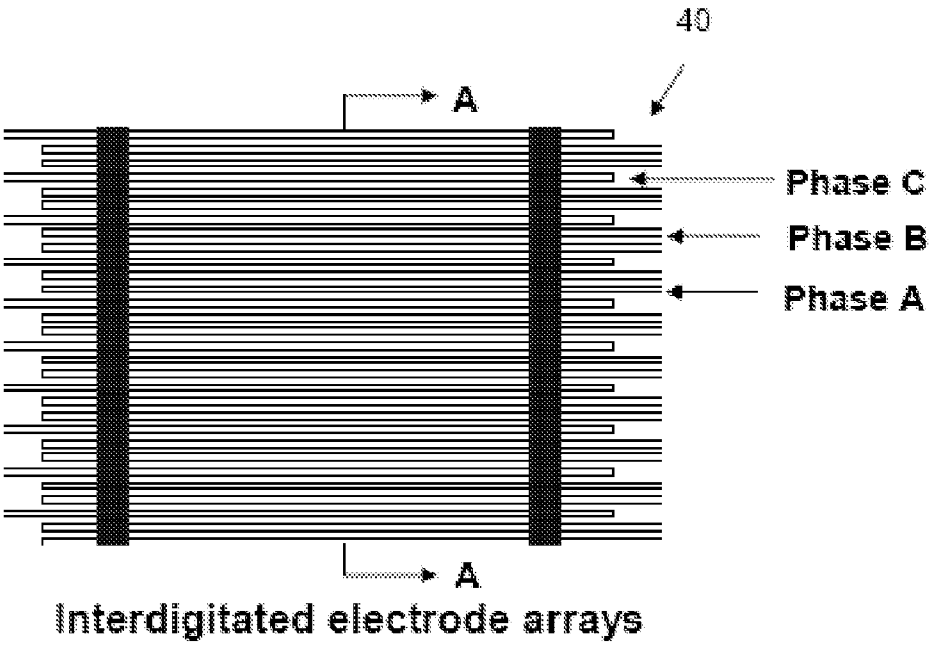
FIG. 10*b* is a schematic enlargement of the electrode array of FIG. 10*a*.
Figure 10C:
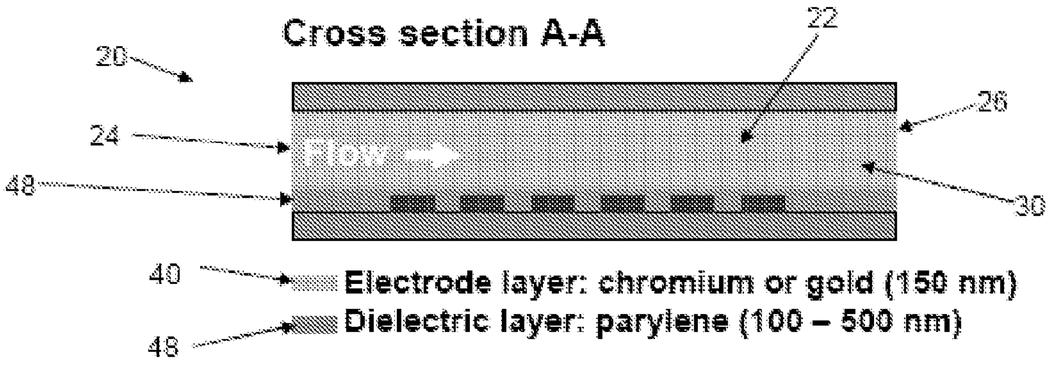
FIG. 10*c* is a schematic representation of a flow channel along section AA of FIG. 10*b*.
Figure 10D:
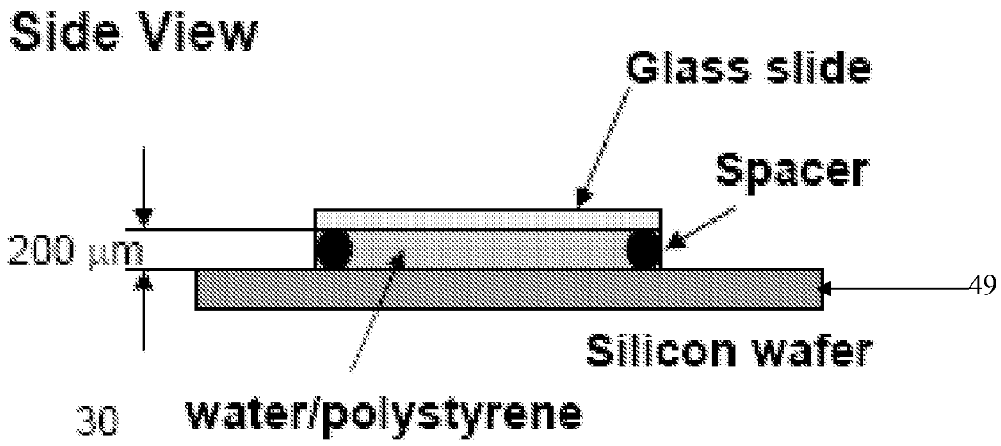
FIG. 10*d* is a side view of the flow channel represented in FIG. 10*c*.
Figure 11A:
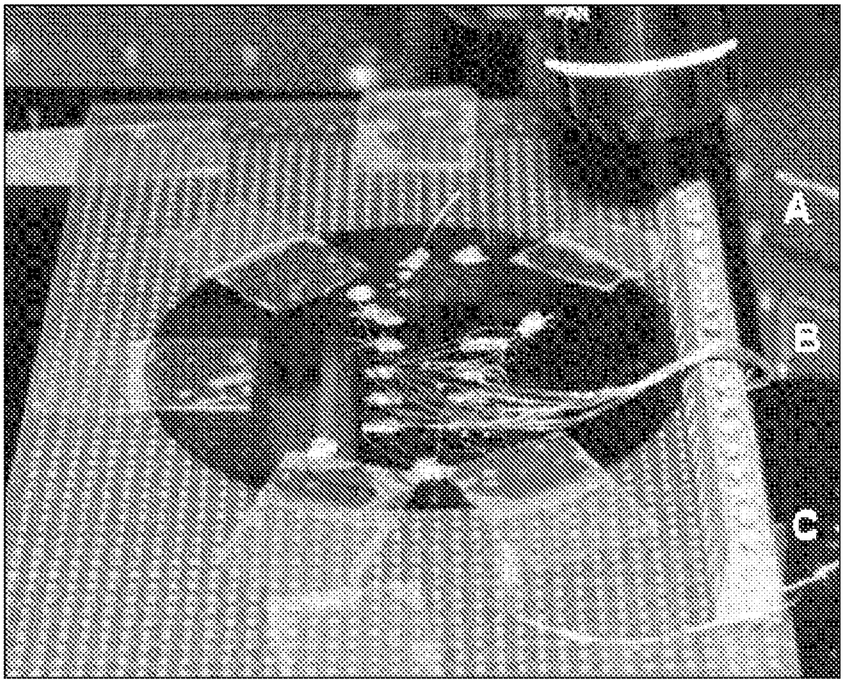
FIG. 11*a* is a photographic representation of a test piece according to one embodiment of the present invention mounted on a PCB.

Referring now to FIGS. 10*a*, 10*b*, 10*c*, and 10*d*, to demonstrate one embodiment of a DEP-induced microfluidic pumping concept, a prototype device was designed and fabricated. The device consists of an array of interdigitated microelectrodes 40 fabricated using photolithography. The microelectrodes are made of a layer of 100 nm thick gold that is e-beam evaporated onto a non-oxidized silicon wafer 49. The array contains 10 parallel thin-bar microelectrodes, 20 μm wide each and separated by 180 μm gaps. The rather large gap was chosen to reduce electrical leakage between electrodes and to alleviate electrothermal effects caused by Joule heating. A layer 48 of Parylene C (thickness 500 nm) was deposited over the electrode array to avoid electrolysis and corrosion of the electrodes when the device is in contact with the particle suspensions. A flow channel is constructed by placing a 500 mm thick Pyrex glass slide over two 200 mm thick spacers on either side of the device, which are sealed with epoxy as shown in FIG. 10*d*. The particle suspensions are prepared by thoroughly mixing polystyrene microparticles 34 of 2.9 mm diameter (Duke Scientific, Calif.) with deionized water 32 using a Thermolyne stirrer. The volume fraction is estimated to be 1%.

Figure 11B:
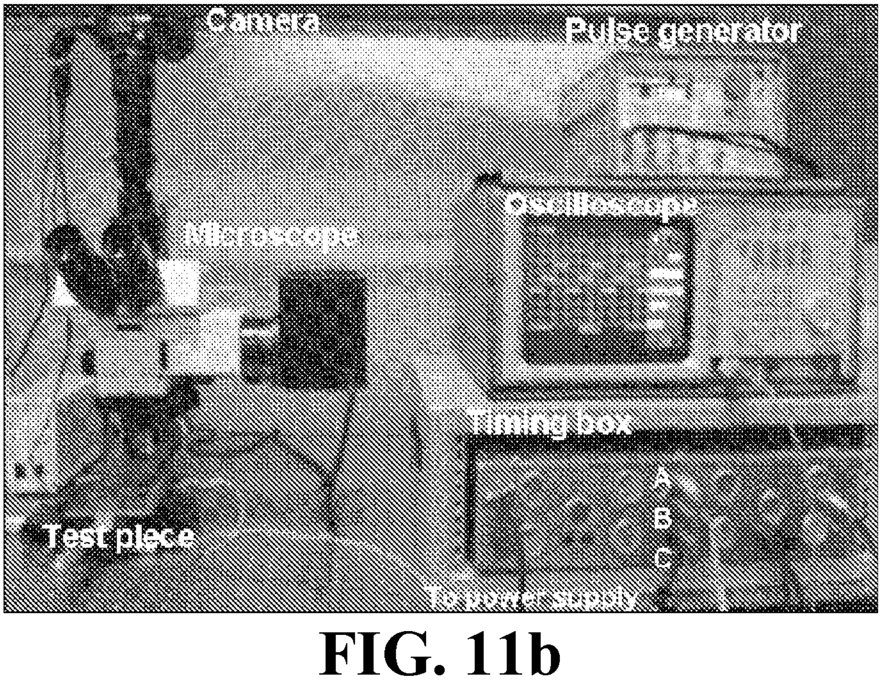
FIG. 11*b* shows an experimental setup as used to operate and monitor the apparatus of FIG. 11*a* according to one embodiment of the present invention.

In the experiments, the wire-bonded DEP device is mounted on a printed circuit board and the electrodes connected to an AC voltage of frequency f, as shown in FIG. 11. The applied electric signals are controlled by a pulse generator (Berkeley Nucleonics Model 565, CA) and a custom-built timing circuit. The applied voltage ranges from 10 to 30 V, with frequencies ranging from 1 to 1000 kHz. A digital oscilloscope (Tektronix TDS 3032B, OR) is used to monitor the frequency and waveform of the applied signals during the experiments. The particle motion is recorded with a CCD camera (Olympus C5060) under an Olympus BXFM microscope. An Olympus LMPLFL 20X objective lens (N.A.=0.4, working distance=12 mm) is used for the measurement.

Figure 12A:
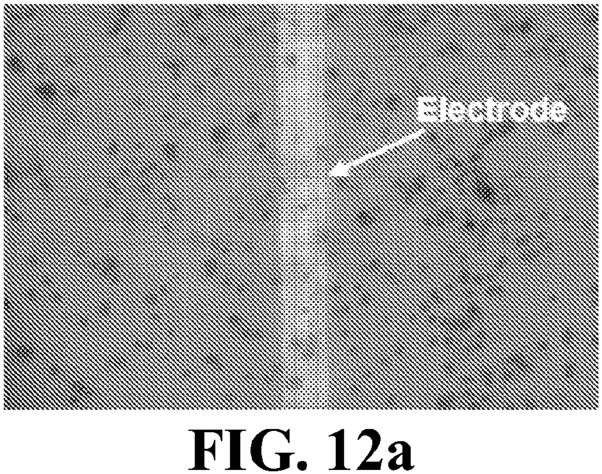
FIG. 12*a* shows a random dispersion of microparticles prior to applying an electric field.
Figure 12B:
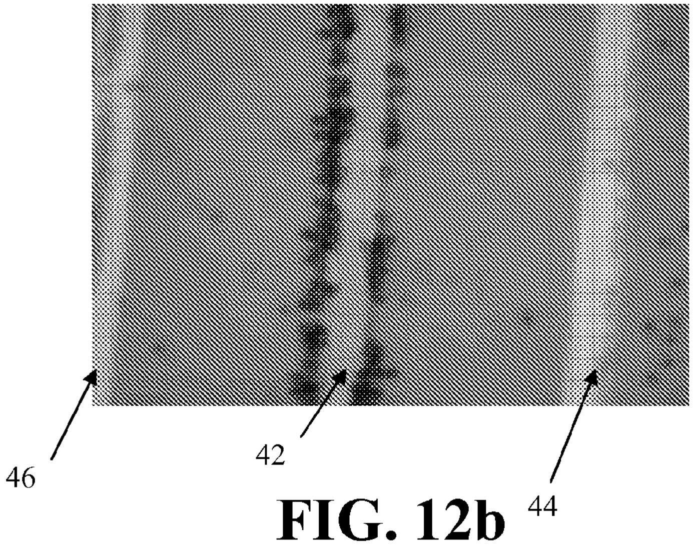
FIG. 12*b* is a photographic depiction of particles collecting proximate to the microelectrodes when exposed to a positive DEP.
Figure 12C:
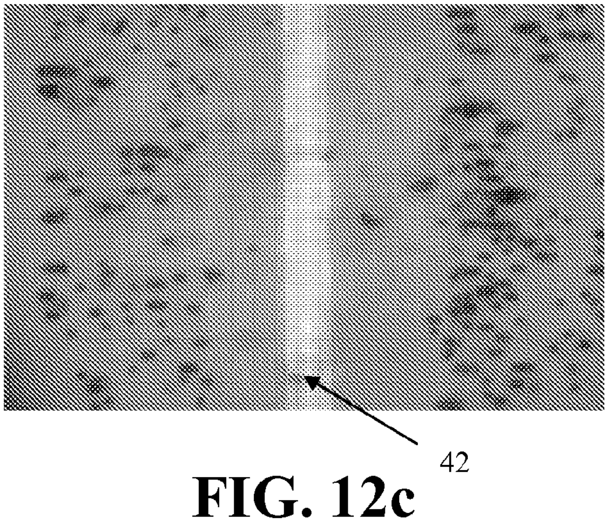
FIG. 12*c* is a photographic depiction of particles being repelled from the microelectrodes when exposed to a negative DEP.

FIG. 12*a* shows the random dispersion of particles before application of the electric field. The particles oscillate a little around their equilibrium positions due to Brownian motion. Once a low-frequency signal (below 1 kHz) is applied, the particles collect at the edge of the electrode, as shown in FIG. 12*b*, designating the occurrence of positive DEP. Upon increasing the frequency to 100 kHz, a negative DEP force causes the particles to be repelled from the electrode to the gap region, as illustrated in FIG. 12*c*. If the frequency falls in the effective twDEP range (10~100 kHz), the particles experience traveling-wave DEP forces and travel in the transverse plane parallel to the microelectrode array. Positions of the particles at consecutive time instants under this condition were recorded at a 15 fps frame rate. In the measurements, the microscope was adjusted to focus at a distance from the wall where the particle velocity is visualized to reach its peak. The translational motion of individual particles is clearly illustrated in FIG. 13.

Figure 14A:
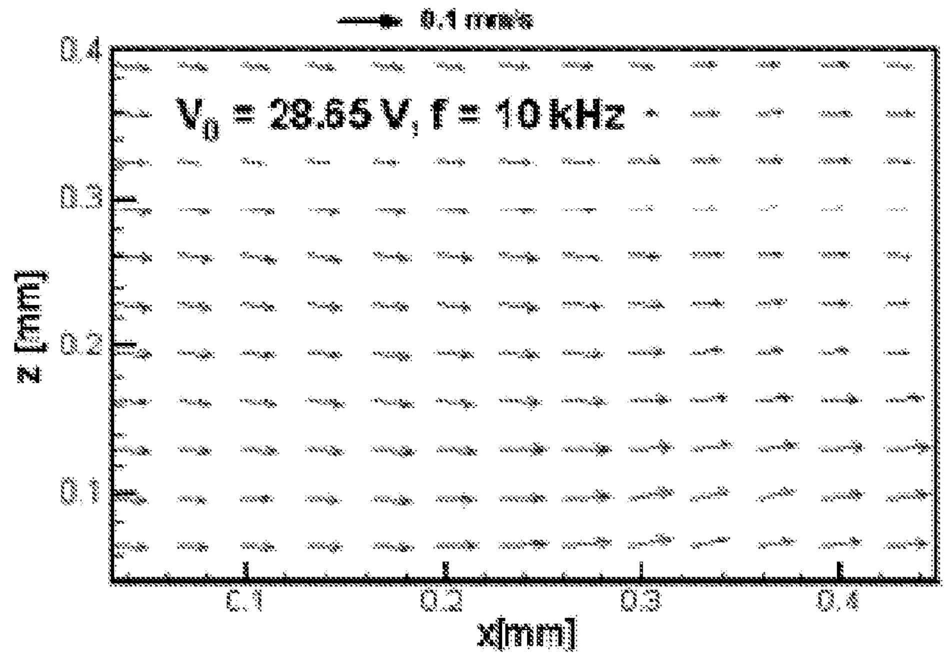
FIG. 14*a* shows a tw-DEP-induced particle velocity field according to one embodiment of the present invention as measured by using micro-particle image velocimetry (RIV).

Micro-particle image velocimetry (μPIV) was used in conjunction with the images to obtain quantitative measurements of the spatially resolved velocity field. The measurement uncertainty in the particle velocity was estimated to be 5.14 μm/s. FIG. 14*a* shows a sample result of the measured particle velocity field. It can be seen that the velocity field is nearly uniform within the measurement plane. From Eq. (11), it is expected that a velocity lag exists between the particle and the surrounding fluid at equilibrium, which must be considered in deducing the flow field from the μPIV measurements. Note that the traveling-wave DEP component is the driving force for the observed particle motion. Therefore, the velocity lag can be estimated from $$|\vec{u}_p - \vec{u}_m| \cong \left|\frac{\vec{F}_{twDEP}}{6\pi\mu_f a}\right| \tag{17}$$

where $$\vec{F}_{twDEP} = 2\pi a^3 \in_m Im[f_{CM}](E_x^2\nabla\Phi_x + E_y^2\nabla\Phi_y + E_z^2\nabla\Phi_z)$$

Figure 14B:
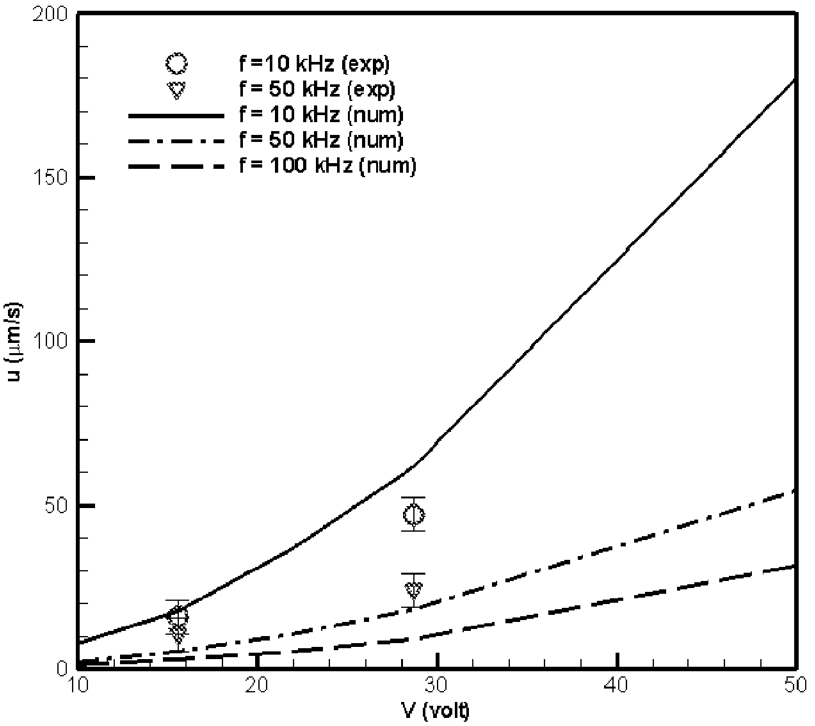
FIG. 14*b* shows a graphical comparison of average media velocity as function of applied voltage and frequency according to several embodiments of the present invention.

For instance, for the experimental conditions associated with the μPIV measurement in FIG. 14*a* ($V_0$=28.6 Volts and f=10 kHz), the velocity lag is approximately 5.2 μm/s so that a flow velocity of 47.1 μm/s may be deduced. Upon changing the focal plane of the microscope objective, it was observed that the velocity profile qualitatively followed the parabolic distribution shown in FIG. 15. Given the near-uniform twDEP force and the distance from the electrodes, it is believed that this is possible through hydrodynamic interactions between the particles and the fluid. The average maximum flow velocities extracted from the μPIV measurements are plotted in FIG. 14*b*. Comparison of the experimental data with the numerical results shows satisfactory agreement (the measurement uncertainty in the flow velocity is believed to be about 5 μm/s). In addition, the numerical results imply that the flow velocity could be tripled to 180 μm/s upon doubling the voltage to 50 V at 10 kHz. For optimized electrode design and appropriate selection of particle concentration, it is expected that the induced flow field can be significantly enhanced. Various contemplated embodiments range from particle concentrations of about 0.1% to about 5%.

Figure 16:
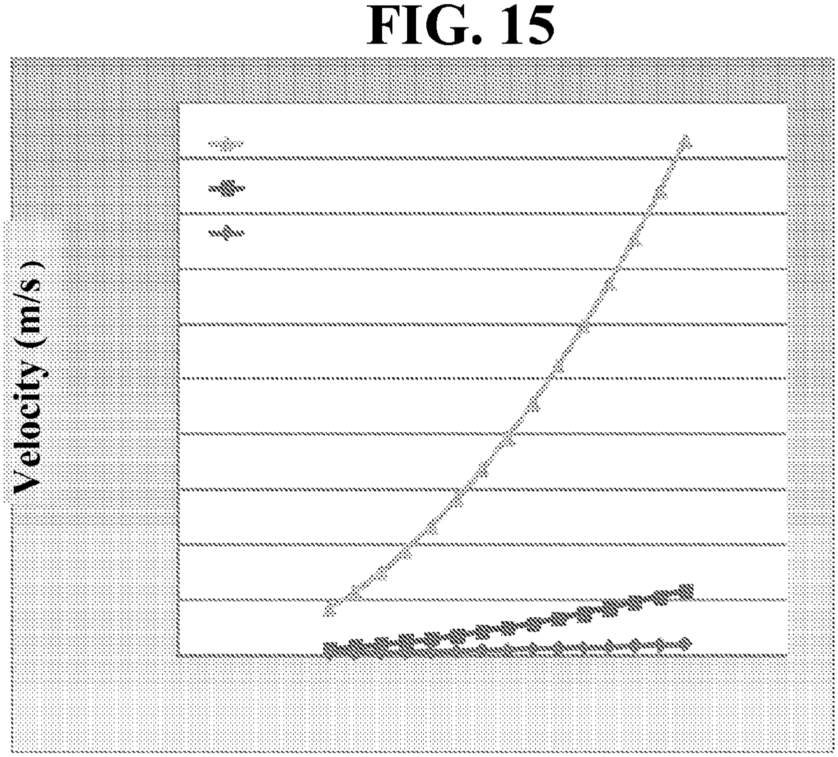
FIG. 16 shows particle velocity as a function of applied voltage and inter-electrode spacing according to various embodiments of the present invention (polystyrene particle (2.9-μm diameter) in water solution; electrode width 20 μm).

FIG. 16 shows results from illustrative examples according to various embodiments of the present invention. For particle suspensions of very low concentration, the particle velocity is affected by the spacing between electrodes, d, and the applied voltage. Decreasing electrode spacing is more efficient than applying higher voltage to increase particle velocity. The maximum particle velocity for d=50 μm at 100 V is ~0.02 m/s. For some particle concentrations, the fluid velocity can be higher than the individual particle velocity.

The microelectrode array can be strategically designed and the frequency of the applied electric field can be modulated to achieve various flow velocity profiles. When nanofluids are used, flow actuation and heat transfer enhancement can be achieved simultaneously without external pumps.

This technology can be utilized for fluid delivery in general microfluidic applications and electronics cooling. FIG. 17 shows a cooling system 60 in which heat is transferred from a source 62 into the mixture 30 comprising the fluid 32 and microparticles or nanoparticles 34. The electrical fields generated by the electrode array 40 produce a twDEP that move the fluid in a direction 66 where the heat will be rejected into a heat sink 64 (not shown). In yet other embodiments of the present invention, the fluid and particle transporting method and apparatus described herein are suitable for delivery of drugs and manipulation of bioparticles.

Although what has been shown and described herein are interdigitated arrays of electrodes having uniform spacing, various embodiments of the present invention are not so constrained. Some embodiments of the present invention contemplate arrays in which the spacing between electrodes is different at various locations within the flowpath. For example, in those embodiments in which the particles and media are exchanging heat from an object to a heat sink, certain narrower portions of the flowpath, in which the flow area is small compared to other portions of the flowpath, the electrodes can be closely spaced so as to increase particle and media velocity through the narrower portions of the flowpath. In yet other portions of the flowpath, for example those portions in which it is desirable to have higher residence time for the particles to exchange heat by conduction, it may be helpful to have electrodes that are more widely spaced apart so that the particle velocity is reduced and the residence time increased. In yet other applications it may be helpful to have closely spaced electrodes in order to increase particle velocity and thereby increase convective heat exchange within the media.

While the inventions have been illustrated and described in detail in the drawings and foregoing description, the same is to be considered as illustrative and not restrictive in character, it being understood that only a few embodiments have been shown and described, and that all changes and modifications that come within the spirit of the invention are desired to be protected.

The invention claimed is:

1. A method for inducing flow in a fluid, comprising:

providing a source of a first electric field alternating at a frequency selectable within a range of frequencies and a second electric field alternating at the frequency and being temporally spaced from the first electric field by a phase angle, a fluid flowpath in electrical communication with the first electric field and second electric field, a fluid media having a complex media permittivity $\in_m$, and a plurality of particles having a complex particle permittivity $\in_p$;

placing the fluid and the particles in a colloidal suspension within the flowpath;

selecting the frequency such that:

$Re[f_{CM}]$ is less than about zero, and $Im[f_{CM}]$ is less than about −0.02, wherein $[f_{CM}]$ is the Clausius-Mossotti factor:

$$\tilde{f}_{CM} = \left(\frac{\tilde{\varepsilon}_p - \tilde{\varepsilon}_m}{\tilde{\varepsilon}_p + 2\tilde{\varepsilon}_m}\right);$$

applying the first electric field at the frequency to the flowpath and the second electric field at the frequency to the flowpath;

driving the particles to move in a direction by the action of the first and second electric fields; and inducing flow of the fluid media in the direction by viscous drag of the particles on the fluid media.

2. The method of claim 1 wherein said providing includes a source of a third electric field alternating at the frequency and being temporally spaced from the first electric field and the second electric field by an additional phase angle, and wherein said applying includes applying the third electric field at the frequency to the flowpath, and said driving includes by the action of the third electric field.

3. The method of claim 2 wherein each phase angle is about 120 degrees.

4. The method of claim 1 wherein the phase angle is more than about 30 degrees and less than about 150 degrees.

* * * * *